US012598605B2

(12) United States Patent (10) Patent No.: US 12,598,605 B2

Wu (45) Date of Patent: Apr. 7, 2026

(54) WIRELESS COMMUNICATION METHOD AND DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 369 days.

(21) Appl. No.: 18/227,564

(22) Filed: Jul. 28, 2023

(65) Prior Publication Data

US 2023/0371020 A1 Nov. 16, 2023

Related U.S. Application Data

(63) Continuation of application No. PCT/CN2021/074732, filed on Feb. 1, 2021.

(51) Int. Cl.
*H04W 72/1263* (2023.01)
*H04L 1/1812* (2023.01)
*H04W 72/20* (2023.01)

(52) U.S. Cl.
CPC ....... *H04W 72/1263* (2013.01); *H04L 1/1812* (2013.01); *H04W 72/20* (2023.01)

(58) Field of Classification Search
CPC ............. H04W 72/1263; H04W 72/20; H04L 1/1812; H04L 1/1861; H04L 1/1864; H04L 5/0055; H04L 1/1854
See application file for complete search history.

(56) References Cited

U.S. PATENT DOCUMENTS

2021/0051665 A1* 2/2021 Fakoorian ............. H04L 1/1607
2022/0174707 A1* 6/2022 Kim ...................... H04W 72/23
(Continued)

FOREIGN PATENT DOCUMENTS

CN 110149717 A 8/2019
CN 110708146 A 1/2020
(Continued)

OTHER PUBLICATIONS

International Search Report and Written Opinion dated Nov. 4, 2021 in International Application No. PCT/CN2021/074732. English translation attached.
(Continued)

*Primary Examiner* — Abdullahi Ahmed
(74) *Attorney, Agent, or Firm* — Sheppard, Mullin, Richter & Hampton LLP

(57) ABSTRACT

The present disclosure provides a wireless communication method and device. The method includes: receiving, by a first device, first control information, the first control information being used to schedule transmission of S physical channels, at least one of the S physical channels corresponding to a first physical channel group or a first feedback bit group, the first physical channel group or the first feedback bit group corresponding to a first Hybrid Automatic Repeat reQuest-Acknowledgement (HARQ-ACK) codebook, the first HARQ-ACK codebook corresponding to a first feedback resource, the first control information corresponding to a first control information format, and transmission of a maximum number M of physical channels being schedulable by the first control information format, M≥2, and 1≤S≤M; and transmitting, by the first device, the first HARQ-ACK codebook via the first feedback resource.

26 Claims, 5 Drawing Sheets

(56)     References Cited

U.S. PATENT DOCUMENTS

| | | | |
|---|---|---|---|
| 2022/0272673 A1 | 8/2022 | Yang et al. | |
| 2023/0344606 A1* | 10/2023 | Wu | H04L 1/1861 |
| 2023/0412320 A1* | 12/2023 | Lei | H04L 1/1861 |
| 2024/0007228 A1* | 1/2024 | Wu | H04W 72/20 |

FOREIGN PATENT DOCUMENTS

| | | | |
|---|---|---|---|
| CN | 110875814 A | 3/2020 |
| CN | 111092697 A | 5/2020 |
| CN | 111865512 A | 10/2020 |
| CN | 111954307 A | 11/2020 |
| EP | 3471309 A1 | 4/2019 |
| WO | 2020059671 A1 | 3/2020 |
| WO | 2020204561 A1 | 10/2020 |
| WO | 2021015520 A1 | 1/2021 |

OTHER PUBLICATIONS

Huawei et al. "R1-2007580 "Discussion on multi-carrier scheduling using single PDCCH"" 3GPP TSG RAN WG1 Meeting #103-e, Oct. 23, 2020 (Oct. 23, 2020), pp. 1-8.
Intel Corporation, "Presentation of Report to TSG:TR 38.808 v100: Study on supporting NR from 52.6 GHz to 71 GHz"3GPP TSG-RAN Meeting #90-e Tdoc RP-202254, Nov. 29, 2020, Section 4.1.3.3.
Extended European Search Report dated Feb. 26, 2024 received in European Patent Application No. EP21921955.7.

* cited by examiner

200

| First device | | Second device |

S210, first control information, the first control information being used to schedule transmission of S physical channels, at least one of the S physical channels corresponding to a first physical channel group or a first feedback bit group, the first physical channel group or the first feedback bit group corresponding to a first Hybrid Automatic Repeat reQuest-Acknowledgement (HARQ-ACK) codebook, the first HARQ-ACK codebook corresponding to a first feedback resource, the first control information corresponding to a first control information format, and transmission of a maximum number M of physical channels being schedulable by the first control information format, where M is a positive integer greater than or equal to 2, and S is a positive integer greater than or equal to 1 and smaller than or equal to M S220, transmitting the first HARQ-ACK codebook via the first feedback resource

FIG. 4

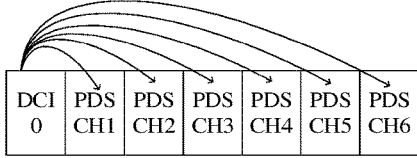
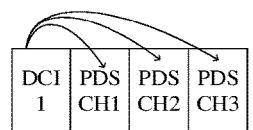
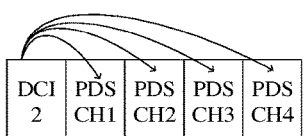

FIG. 5

WIRELESS COMMUNICATION METHOD AND DEVICE

CROSS-REFERENCE TO RELATED APPLICATIONS

This application is a continuation of International Application No. PCT/CN2021/074732 filed on Feb. 1, 2021, the entire contents of which are incorporated herein by reference.

TECHNICAL FIELD

Embodiments of the present disclosure relate to communication technology, and more particularly, to a wireless communication method and device.

BACKGROUND

In a high-frequency system, due to a relatively large subcarrier spacing, each time slot occupies a relatively short time length. If the scheme of scheduling Physical Downlink Shared Channel (PDSCH) on a per time slot basis in a low-frequency system continues to be used, terminal devices will be required to detect Physical Downlink Control Channel (PDCCH) in each time slot, which requires the terminal devices to have high processing capabilities.

Therefore, there is an urgent need to enhance the scheme of scheduling PDSCH for a high-frequency system to improve system performance.

SUMMARY

The present disclosure provides a wireless communication method and device.

In a first aspect, a wireless communication method is provided. The method includes: receiving, by a first device, first control information transmitted by a second device, the first control information being used to schedule transmission of S physical channels, at least one of the S physical channels corresponding to a first physical channel group or a first feedback bit group, the first physical channel group or the first feedback bit group corresponding to a first Hybrid Automatic Repeat reQuest-Acknowledgement (HARQ-ACK) codebook, the first HARQ-ACK codebook corresponding to a first feedback resource, the first control information corresponding to a first control information format, and transmission of a maximum number M of physical channels being schedulable by the first control information format, where M is a positive integer greater than or equal to 2, and S is a positive integer greater than or equal to 1 and smaller than or equal to M; and transmitting, by the first device, the first HARQ-ACK codebook via the first feedback resource.

In a second aspect, a first device is provided. The first device includes a processor and a memory. The memory has a computer program stored thereon, and the processor is configured to invoke and execute the computer program stored in the memory to perform the method according to the above first aspect or any implementation thereof.

BRIEF DESCRIPTION OF DRAWINGS

FIG. 4 is a schematic flowchart illustrating a wireless communication method according to an embodiment of the present disclosure.

FIG. 5 is a schematic diagram showing an example of physical channels scheduled by multiple pieces of control information under a single-carrier scenario according to an embodiment of the present disclosure.

DESCRIPTION OF EMBODIMENTS

Figure 1:
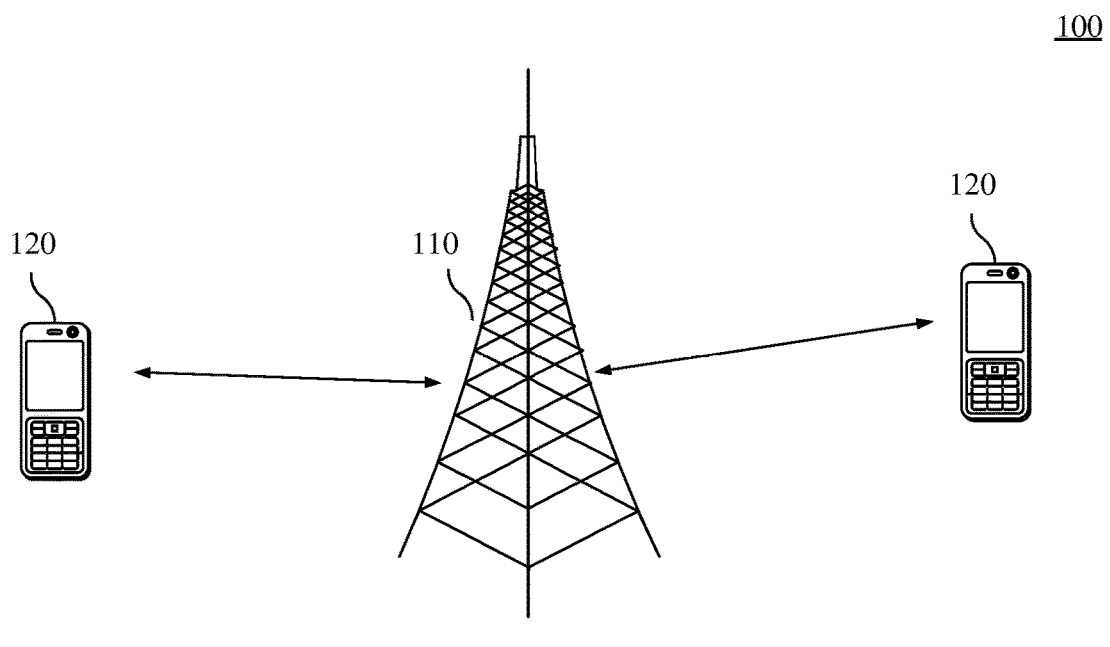
FIG. 1 is a schematic diagram showing an exemplary communication system architecture where an embodiment of the present disclosure is applied.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the 5th Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device.

The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical treatment, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, FIG. 1 is a schematic diagram showing an architecture of a communication system 100 where an embodiment of the present disclosure is applied. A shown in FIG. 1, the communication system 100 may include a network device 110 which may be a device communicating with a terminal device 120 (or referred to as communication terminal or terminal). The network device 110 may provide communication coverage for a particular geographic area, and may communicate with terminal devices located within the coverage.

Optionally, the wireless communication system may also include other network entities such as a network controller, or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are provided only for explaining the specific embodiments of the present disclosure, rather than limiting the present disclosure. The terms such as "first", "second", etc., as used in the description, claims and figures of the present disclosure are used for distinguishing different objects from each other, rather than defining a specific order. In addition, the terms such as "include" and "have" and any variants thereof are intended to cover non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

Optionally, indication information in the embodiments of the present disclosure may include physical layer signaling such as at least one of Downlink Control Information (DCI), System Information (SI), Radio Resource Control (RRC) signaling, or Media Access Control Control Element (MAC CE).

Optionally, in the embodiments of the present disclosure, high-layer parameters or high-layer signaling may include at least one of Radio Resource Control (RRC) signaling, or Media Access Control Control Element (MAC CE).

Optionally, in the embodiments of the present disclosure, "predetermined" may be implemented as pre-storing in one or more devices (for example, including a terminal device and a network device) corresponding codes, tables or other means that can be used to indicate related information, and the present disclosure is not limited to its specific implementation. For example, "predetermined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

The NR system currently mainly considers two frequency bands, Frequency Range 1 (FR1) and Frequency Range (FR2). The frequency domain ranges included in FR1 and FR2 are shown in Table 1.

TABLE 1

| Frequency Band Definition | Corresponding Frequency Band Range |
| --- | --- |
| FR1 | 410 MHz-7.125 GHz |
| FR2 | 24.25 GHz-52.6 GHz |

With the evolution of the NR system, researches on technologies in new frequency bands such as high-frequency have also begun. The frequency domain range included in the new frequency band is shown in Table 2. For the convenience of description, it is represented as FRX in the present disclosure. It should be understood that the name of the frequency band should not constitute any limitation. For example, FRX may be FR3.

TABLE 2

| New Frequency Band Range | |
| --- | --- |
| Frequency Band Definition | Corresponding Frequency Band Range |
| FRX | 52.6 GHz-71 GHz |

The FRX frequency band includes a licensed spectrum and an unlicensed spectrum. In other words, the FRX frequency band includes a non-shared spectrum and a shared spectrum.

The unlicensed spectrum is a spectrum allocated by the country and region that can be used for radio device communication. This spectrum is usually considered a shared spectrum, that is, communication devices in different communication systems can use the spectrum as long as they meet regulatory requirements set by the country or region on the spectrum, without the need to apply to the government for exclusive spectrum authorization.

In order to allow various communication systems that use the unlicensed spectrum for wireless communication to coexist friendly on this spectrum, some countries or regions have stipulated regulatory requirements that must be met when using the unlicensed spectrum. For example, communication devices shall follow the principle of "Listen Before Talk (LBT)", that is, before the communication device can transmit a signal on a channel of the unlicensed spectrum, it needs to perform channel sensing first, and only when the channel sensing result indicates that the channel is idle, the communication device can transmit the signal. When the channel sensing result of the communication device on the channel of the unlicensed frequency spectrum shows that the channel is busy, the communication device cannot transmit the signal. In another example, in order to ensure fairness, in one transmission, the duration of signal transmission by the communication device using the channel of the unlicensed spectrum cannot exceed a certain period of time. In another example, in order to prevent the power of the signal transmitted on the channel of the unlicensed spectrum from being too high and affecting the transmission of other important signals on the channel, the communication device shall not exceed a maximum power spectral density limit when using the channel of the unlicensed spectrum for signal transmission.

The subcarrier spacing considered in the FRX frequency band may be greater than the subcarrier spacing in FR2. The current candidate subcarrier spacing includes at least one of: 240 kHz, 480 kHz, or 960 kHz. As an example, the corresponding numerologies for these candidate subcarrier spacings are shown in Table 3 below.

TABLE 3

Numerologies Corresponding To Candidate Subcarrier Spacings

| Subcarrier Spacing | Symbol Length | Normal Cyclic Prefix (NCP) Length | Extended CP (ECP) Length | Symbol-with-NCP Length | Slot Length |
|---|---|---|---|---|---|
| 240 kHz | 4.16 µs | 0.292 µs | 1.04 µs | 4.452 µs | 62.5 µs |
| 480 kHz | 2.08 µs | 0.146 µs | 0.52 µs | 2.226 µs | 31.25 µs |
| 960 kHz | 1.04 µs | 0.073 µs | 0.26 µs | 1.113 µs | 15.625 µs |

Dynamic codebook feedback in NR System is introduced below.

For a terminal device with a downlink service, a network device may schedule transmission of a Physical Downlink Shared Channel (PDSCH) for the terminal device via DCI carrying a downlink grant. Here, the downlink grant DCI includes indication information of a Physical Uplink Control Channel (PUCCH) resource, and after receiving the PDSCH, the terminal device will feed back a decoding result of the PDSCH, either Acknowledgment (ACK) or Negative Acknowledgment (NACK) information, to the network device over the PUCCH resource. Here, the NR system supports dynamic determination of HARQ feedback timing. The network device schedules the terminal device to receive the PDSCH via DCI, which includes indication information of the PUCCH resource for transmitting the HARQ-ACK corresponding to the PDSCH.

Specifically, the indication information may include:

a PUCCH resource indicator used to determine the PUCCH resource; and a Hybrid Automatic Repeat reQuest (HARQ) feedback timing indicator (PDSCH-to-HARQ_feedback timing indicator) used to dynamically determine a time domain position of a HARQ feedback resource, such as a time slot of the HARQ feedback resource, usually represented by K1. The HARQ feedback timing indication information indicates a value in a HARQ feedback timing set. The HARQ feedback timing set may be predetermined, or configured by the network device. For example, and the HARQ feedback timing indication information may include 3 bits. When the HARQ feedback timing indication information is 000, it indicates the first value in the HARQ feedback timing set; when the HARQ feedback timing indication information is 001, it indicates the second value in the HARQ feedback timing set, and so on. If the HARQ feedback timing indication information indicates an invalid K1 in the HARQ feedback time timing set (for example, the indicated K1 value is –1), it means that the time slot in which the PUCCH resource is located is temporarily uncertain.

The terminal device performs semi-static codebook feedback and dynamic codebook feedback when performing HARQ-ACK feedback. For example, the semi-static codebook feedback may be Type-1 HARQ-ACK codebook feedback or Type-3 HARQ-ACK codebook feedback, and the dynamic codebook feedback may be Type-2 or eType-2 HARQ-ACK codebook feedback.

If the terminal device is configured with Type-2 HARQ-ACK codebook feedback, the Type-2 HARQ-ACK codebook includes HARQ-ACK information corresponding to the scheduled PDSCH in one HARQ-ACK feedback window. The DCI format scheduling PDSCH includes a Downlink Assignment Index (DAI) information field: Counter DAI (C-DAI) information. The C-DAI information indicates that the downlink transmission scheduled by the current DCI is which downlink transmission within the HARQ feedback window. The C-DAI information is ordered according to the detection opportunity order of the PDCCH.

In some cases, such as carrier aggregation scenario, DCI may also include: Total DAI (T-DAI) information. The T-DAI indicates how many downlink transmissions are included until the current DCI schedule within the HARQ feedback window.

The HARQ feedback window is determined according to the HARQ feedback timing set.

If the terminal device is configured with an eType-2 (enhanced Dynamic) HARQ-ACK codebook feedback, the eType-2 HARQ-ACK codebook includes at least the HARQ-ACK information corresponding to PDSCHs in one group that are scheduled. The network device may group the scheduled PDSCHs and indicate the grouping information of the PDSCHs via explicit signaling, so that the terminal device may perform corresponding HARQ-ACK feedback according to different groups after receiving PDSCH. In eType-2 codebook feedback, the terminal device may be configured with up to two PDSCH groups.

To support generation and feedback of the eType-2 codebook, the DCI format scheduling PDSCH includes the following information fields.

PDSCH group identification indicator: it indicates the channel group to which the PDSCH scheduled by the current DCI belongs. The PDSCH group indicated by the PDSCH group identification indicator is referred to as a scheduled group, and another PDSCH group that is not indicated by the PDSCH group identification indicator is referred to as a non-scheduled group.

New Feedback Indicator (NFI): it indicates the start position of the HARQ-ACK information corresponding to the scheduled group. If the NFI information is flipped, it means that the HARQ-ACK codebook corresponding to the current scheduled group is reset (or the starting point of the corresponding HARQ feedback window).

C-DAI information: it indicates that the downlink transmission scheduled by the current DCI is which downlink transmission corresponding to the scheduled group within the HARQ feedback window. The C-DAI information is ordered according to the detection opportunity order of the PDCCH.

In some cases, such as in carrier aggregation scenario, it can also include the following.

T-DAI information: it indicates how many downlink transmissions corresponding to the scheduled group are included until the current DCI schedule within the HARQ feedback window.

Feedback request group number indicator: it indicates the HARQ-ACK information corresponding to one PDSCH group or two PDSCH groups needs feedback. If the feedback request group number information field is set to 0, the terminal device needs to perform the HARQ-ACK feedback for the current scheduled group. If the feedback request group number information field is set to 1, the terminal device needs to perform the HARQ-ACK feedback for two groups, namely the scheduled group and the non-scheduled group.

When the terminal device is configured with the eType-2 codebook feedback, since the terminal device can feedback the HARQ-ACK information corresponding to up to two PDSCH groups, in order to make the feedback codebook more accurate, the network device may also configure the terminal device, in the DCI format via high-layer parameters, with the indication information that is used to generate the HARQ-ACK codebook of the non-scheduled group:

NFI for the non-scheduled group: it is used to jointly indicate, with the PDSCH group identification of the non-scheduled group, the HARQ-ACK codebook corresponding to the non-scheduled group within the HARQ feedback window.

T-DAI for the non-scheduled group: it indicates the total amount of pieces of HARQ-ACK information included in the non-scheduled group within the HARQ feedback window.

The HARQ feedback window is determined based on at least one of the NFI information, the HARQ feedback timing set, or the PUCCH resource.

Based on the information domain in the above DCI, the terminal device can dynamically generate the eType-2 codebook and transmit the HARQ-ACK information.

Figure 2:
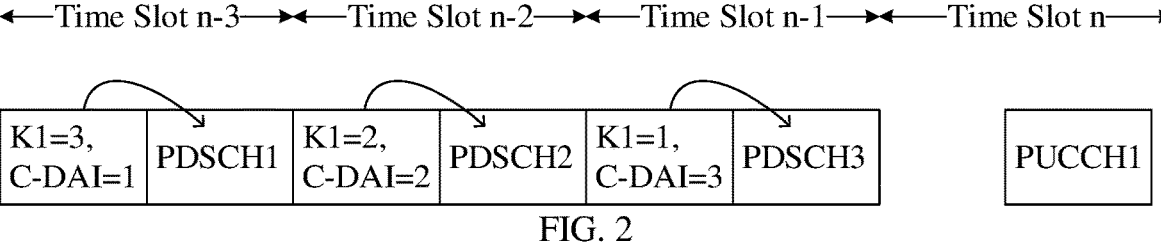
FIG. 2 is a schematic diagram showing an example of Counter-Downlink Assignment Index (C-DAI) information under Type-2 HARQ-ACK codebook feedback.

FIG. 2 is a schematic diagram showing an example of C-DAI information under Type-2 HARQ-ACK codebook feedback according to an embodiment of the disclosure.

As shown in FIG. 2, if K1 in the DCI received by the terminal device in time slot n-3 indicates 3 and C-DAI=1 and the DCI schedules PDSCH1; K1 in the DCI received in time slot n-2 indicates 2 and C-DAI=2 and the DCI schedules PDSCH2; K1 in the DCI received in time slot n-1 indicates 1 and C-DAI=3 and the DCI schedules PDSCH3 (that is, the HARQ feedback timing indication information K1 included in the above DCI all indicates that the feedback time unit is time slot n), then the terminal device may determine that PDSCH1, PDSCH2 and PDSCH3 are the 1st, 2nd, and 3rd downlink transmissions within the HARQ feedback window according to the received C-DAI information. Correspondingly, the HARQ-ACK codebook fed back by the terminal device on PUCCH1 in the time slot n includes the decoding result of PDSCH1, the decoding result of PDSCH2 and the decoding result of PDSCH3 in turn.

The number of downlink transmissions is described in conjunction with Table 4 and Table 5 below. Table 4 shows a schematic table indicating the order number of the downlink transmission or the number of downlink transmissions when the C-DAI information or T-DAI information in the DCI scheduling downlink includes 2 bits. Table 5 shows a schematic table indicating the order number of the downlink transmission or the number of downlink transmissions when the C-DAI information in the DCI scheduling downlink includes 1 bit. LSB represents Least Significant Bit (LSB) and MSB represents Most Significant Bit (MSB).

TABLE 4

| 2 bits of DAI information MSB, LSB | Value of C-DAI information or T-DAI information | $Y \geq 1$, Y represents the order number of downlink transmission or the number of downlink transmissions, $T_D = 4$ |
|---|---|---|
| 0, 0 | 1 | $(Y - 1) \bmod T_D + 1 = 1$ |
| 0, 1 | 2 | $(Y - 1) \bmod T_D + 1 = 2$ |
| 1, 0 | 3 | $(Y - 1) \bmod T_D + 1 = 3$ |
| 1, 1 | 4 | $(Y - 1) \bmod T_D + 1 = 4$ |

As shown in Table 4, the value range of C-DAI information is from 1 to 4, and the terminal device determines which downlink transmission the value of C-DAI corresponds to according to the C-DAI information and the reception of the downlink transmission. For example, the first downlink transmission, and C-DAI=1; the second downlink transmission, and C-DAI=2; the third downlink transmission, and C-DAI=3; the fourth downlink transmission, and C-DAI=4;

the fifth downlink transmission, and C-DAI=1; the sixth downlink transmission, and C-DAI=2; the seventh downlink transmission, and C-DAI=3; the eighth downlink transmission, and C-DAI=4; and so on, where mod represents a modulo operation.

TABLE 5

| 1 bit of DAI information MSB, LSB | Value of C-DAI information | $Y \geq 1$, Y represents the order number of downlink transmission or the number of downlink transmissions, $T_D = 2$ |
|---|---|---|
| 0 | 1 | $(Y - 1) \bmod T_D + 1 = 1$ |
| 1 | 2 | $(Y - 1) \bmod T_D + 1 = 2$ |

As shown in Table 5, the value range of C-DAI information is from 0 to 1, and the terminal device determines which downlink transmission the value of C-DAI corresponds to according to the C-DAI information and the reception of the downlink transmission. For example, the first downlink transmission, and C-DAI=1; the second downlink transmission, and C-DAI=2; the third downlink transmission, and C-DAI=1; the fourth downlink transmission, and C-DAI=2; and so on.

In the high-frequency system, due to a relatively large subcarrier spacing, each time slot occupies a relatively short time length. If the scheme of scheduling PDSCH on a per time slot basis in a low-frequency system continues to be used, terminal devices will be required to detect PDCCH in each time slot, which requires the terminal devices to have high processing capabilities. In order to lower the requirements on the processing capabilities of the terminal devices, a scheduling scheme of scheduling a plurality of physical channels by using one piece of DCI is introduced.

Taking downlink transmission as an example, the network device can use one piece of DCI to schedule transmission of at least two physical channels such as PDSCHs, or use one piece of DCI to activate at least two downlink resources for transmission of at least two physical channels (here, the at least two downlink resources may belong to a same Semi-Persistent Scheduling (SPS) resource configuration, or belong to different SPS resource configurations). The at least two physical channels may include a first physical channel and a second physical channel. The first physical channel and the second physical channel may be used to transmit different Transport Blocks (TBs), or may be used to transmit a same TB.

Figure 3:
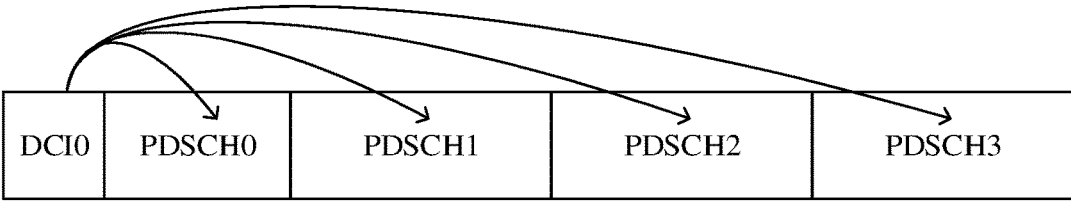
FIG. 3 is a schematic diagram showing an example of one piece of control information scheduling multiple physical channels.

FIG. 3 is a schematic diagram showing an example of one piece of control information scheduling multiple physical channels according to an embodiment of the disclosure.

As shown in FIG. 3, the network device can use DCI0 to schedule transmission of 4 PDSCHs, including PDSCH0, PDSCH1, PDSCH2 and PDSCH3. PDSCH0, PDSCH1, PDSCH2 and PDSCH3 are used to transmit different TBs respectively.

In the high-frequency system, if the scheduling scheme of scheduling a plurality of physical channels by using one piece of DCI is introduced, when the terminal device receives the DCI scheduling multiple physical channels, how to understand the information in the received DCI and how to perform HARQ-ACK feedback for the received multiple physical channels according to the DCI are problems to be solved.

FIG. 4 is a schematic flowchart illustrating a wireless communication method 200 according to an embodiment of the present disclosure. The method 200 may be performed interactively by a first device and a second device.

As shown in FIG. 4, the method 200 may include the following content.

At S210, a first device receives first control information transmitted by a second device. The first control information is used to schedule transmission of S physical channels, at least one of the S physical channels corresponds to a first physical channel group or a first feedback bit group, the first physical channel group or the first feedback bit group corresponds to a first Hybrid Automatic Repeat reQuest-Acknowledgement (HARQ-ACK) codebook, the first HARQ-ACK codebook corresponds to a first feedback resource, the first control information corresponds to a first control information format, and transmission of a maximum number M of physical channels is scheduled by the first control information format, where M is a positive integer greater than or equal to 2, and S is a positive integer greater than or equal to 1 and smaller than or equal to M.

At S220, the first device transmits the first HARQ-ACK codebook via the first feedback resource.

With the solution in the present disclosure, the first control information format corresponding to the first control information supports scheduling the transmission of the maximum number M of physical channels, which can ensure that the downlink transmission of the terminal device can be scheduled in each time slot even when the terminal device doesn't monitor PDCCH in each time slot, enhancing the scheme of scheduling PDSCH and improving system performance. Especially for the high-frequency system, the capability requirements of the terminal device to monitor PDCCH can be reduced. Further, with the first control information being used to schedule the transmission of S physical channels, at least one of the S physical channels corresponds to the first physical channel group or the first feedback bit group, the first physical channel group or the first feedback bit group corresponds to the first HARQ-ACK codebook, and then the first HARQ-ACK codebook is transmitted via the first feedback resource, which can ensure that the first device performs HARQ-ACK feedback for the physical channel schedule by the first control information, and guarantee the communication quality.

Optionally, at least one physical channel includes a Physical Downlink Shared Channel (PDSCH), the first device includes a terminal device, the second device includes a network device, and the first control information includes downlink control information (DCI).

Optionally, at least one physical channel includes a sidelink physical channel, the first device includes a first terminal device, and the second device includes a second terminal device or network device. Optionally, the first control information includes sideline control information or DCI.

Optionally, the first control information being used to schedule the transmission of S physical channels including: the first control information being authorization information, and the authorization information dynamically scheduling the transmission of the S physical channels, or, the first control information is Semi-Persistent Scheduling (SPS) configuration activation information, and the activation information activating the transmission of S physical channels. Optionally, the first feedback resource includes an uplink resource.

For example, the first feedback resource includes a Physical Uplink Control Channel (PUCCH) resource or a Physical Uplink Shared Channel (PUSCH) resource.

Optionally, the first feedback resource includes a sidelink resource. For example, the first feedback resource includes a Physical Sidelink Feedback Channel (PSFCH) resource.

Optionally, at least one of the S physical channels corresponding to the first physical channel group or the first feedback bit group includes: all of the S physical channels corresponding to the first physical channel group or the first feedback bit group.

Optionally, at least one of the S physical channels corresponding to the first physical channel group or the first feedback bit group includes: a first one of the S physical channels corresponding to the first physical channel group or the first feedback bit group, a time interval between the first physical channel and the first feedback resource satisfying a processing timing.

Optionally, at least one of the S physical channels includes all of the S physical channels; or at least one of the S physical channels includes a first one of the S physical channels, a time interval between the first physical channel and the first feedback resource satisfying a processing timing.

Optionally, the time interval between the first physical channel and the first feedback resource satisfying the processing timing includes: a time interval between an end position of the first physical channel and a start position of the first feedback resource satisfying a processing timing, or a time interval between an end position of the first physical channel and a start position of the first feedback resource being greater than or equal to a predetermined value.

Optionally, the first physical channel group or the first feedback bit group corresponding to the first HARQ-ACK codebook includes: the first HARQ-ACK codebook including HARQ-ACK information corresponding to the first physical channel group or the first HARQ-ACK codebook including HARQ-ACK information corresponding to the first feedback bit group.

Optionally, at least one of the S physical channels corresponding to the first physical channel group or the first feedback bit group, and the first physical channel group or the first feedback bit group corresponding to the first HARQ-ACK codebook includes: the first HARQ-ACK codebook including HARQ-ACK information corresponding to at least one of the S physical channels.

Optionally, all of the S physical channels corresponding to the first physical channel group or the first feedback bit group, and the first physical channel group or the first feedback bit group corresponding to the first HARQ-ACK codebook includes: the first HARQ-ACK codebook including HARQ-ACK information corresponding to all of the S physical channels.

Optionally, the first control information includes first DCI, the first DCI corresponds to a first DCI format. Optionally, the first DCI format includes DCI format 1_1 and/or DCI format 1_2. Optionally, the first DCI format includes other DCI formats that can use one piece of DCI to schedule multiple PDSCHs. For example, DCI format 1_x.

In an embodiment of the present disclosure, the network device may use a piece of control information, such as DCI, to schedule transmission of at least two physical channels, such as PDSCHs, or may use a piece of control information such as DCI to activate at least two preconfigured resources, such as downlink resources, for transmission of at least two physical channels, such as SPS PDSCHs. In the case where the dynamic codebook feedback such as Type-2 or eType-2 is configured, how the terminal device generates the first HARQ-ACK codebook including the HARQ-ACK information corresponding to the at least one physical channel, and how to perform HARQ-ACK feedback for the received multiple physical channels, are further technical problems to be solved in the present disclosure.

Optionally, the at least two preconfigured resources may belong to the same SPS resource configuration or to different SPS resource configurations.

In some embodiments of the present disclosure, the first physical channel group includes N physical channels, where N is a positive integer greater than or equal to 1; and/or N is a positive integer smaller than or equal to M.

In some embodiments of the present disclosure, the first feedback bit group includes feedback bits of N physical channels, where N is a positive integer greater than or equal to 1; and/or N is a positive integer smaller than or equal to M. For example, each physical channel corresponds to 1 bit of feedback information, and the first feedback bit group includes N bits. For another example, each physical channel corresponds to 2 bits of feedback information, and the first feedback bit group includes 2N bits.

Optionally, the first device is configured with a spatial division bundling feedback mode, and each of the N physical channels corresponds to 1 bit of feedback information. For example, for one physical channel for transmitting two TBs, the HARQ-ACK information corresponding to the two TBs is bound to 1 bit of feedback information. Specifically, if both TBs are correctly decoded, the 1 bit of feedback information is ACK; otherwise, the 1 bit of feedback information is NACK.

Optionally, a value of N is predefined, or determined according to a predefined rule, or configured by the second device.

In some embodiments of the present disclosure, S is smaller than or equal to N; and feedback bit positions of the first S physical channels in feedback bit positions corresponding to the first physical channel group are respectively feedback bit positions of the S physical channels, or feedback bit positions of the first S physical channels in feedback bit positions of the first feedback bit group are respectively feedback bit positions of the S physical channels.

In some embodiments of the present disclosure, S is greater than N; and a feedback bit position of one physical channel in feedback bit positions corresponding to the first physical channel group is a feedback bit position of at least two of the S physical channels adopting bundling feedback, or a feedback bit position of one physical channel in feedback bit positions of the first feedback bit group is a feedback bit position of at least two of the S physical channels adopting bundling feedback.

In some embodiments of the present disclosure, S is greater than (K−1)*N and smaller than or equal to K*N, where K is a positive integer; and a feedback bit position of one physical channel in feedback bit positions corresponding to the first physical channel group is a feedback bit position of K of the S physical channels adopting bundling feedback, or a feedback bit position of one physical channel in feedback bit positions of the first feedback bit group is a feedback bit position of K of the S physical channels adopting bundling feedback.

Optionally, the K physical channels are adjacent K physical channels. For example, the feedback bit position of one physical channel in the feedback bit positions corresponding to the first physical channel group is a feedback bit position of the adjacent K physical channels of the S physical channels adopting bundling feedback; or the feedback bit position of one physical channel in the feedback bit positions of the first feedback bit group is a feedback bit position the adjacent K physical channels of the S physical channels adopting bundling feedback.

In some embodiments of the present disclosure, the feedback information of the K physical channels adopting bundling feedback includes: when feedback information of all of the K physical channels is ACK, feedback information of the K physical channels is ACK; and/or when feedback information of any of the K physical channels is NACK, feedback information of the K physical channels is NACK.

Optionally, the value of K is predefined, or determined according to a predefined rule, or is configured by the second device. For example, the second device configures K to be 2. For another example, the value of K is determined to be 1 according to a predefined rule.

In some embodiments of the present disclosure, the value of N is M.

In some embodiments of the present disclosure, M is greater than N; and a feedback bit position of one physical channel in feedback bit positions corresponding to the first physical channel group is a feedback bit position of at least two of the M physical channels adopting bundling feedback, or a feedback bit position of one physical channel in feedback bit positions of the first feedback bit group is a feedback bit position of at least two of the M physical channels adopting bundling feedback.

Optionally, M is an integer multiple of N. For example, M=8, and N=4. For another example, M=16, and N=4. The feedback bit position of one physical channel in the feedback bit positions of N physical channels corresponding to the first feedback bit group is feedback bit positions of (M/N) physical channels of the M physical channels. Optionally, the feedback mode of the (M/N) physical channels is bundling feedback mode.

In some embodiments of the present disclosure, a feedback bit position of one physical channel in feedback bit positions corresponding to the first physical channel group is a feedback bit position of Ceil (M/N) of the M physical channels adopting bundling feedback; or a feedback bit position of one physical channel in feedback bit positions of the first feedback bit group is a feedback bit position of Ceil (M/N) of the M physical channels adopting bundling feedback, where Ceil ( ) represents a rounding up operation.

In some embodiments of the present disclosure, the feedback information of the Ceil (M/N) physical channels adopting bundling feedback includes: when feedback information of all of the Ceil (M/N) physical channels is ACK, feedback information of the Ceil (M/N) physical channels is ACK; and/or when feedback information of any of the Ceil (M/N) physical channels is NACK, feedback information of the Ceil (M/N) physical channels is NACK.

In some embodiments of the present disclosure, the at least two physical channels are K physical channels, and the value of K is predefined, or determined according to a predefined rule, or is configured by the second device.

In some embodiments of the present disclosure, when feedback information of all of the at least two physical channels is ACK, feedback information of the at least two physical channels is ACK; and/or when feedback information of any of the at least two physical channels is NACK, feedback information of the at least two physical channels is NACK.

In some embodiments of the present disclosure, a value of N is predefined, or determined according to a predefined rule, or configured by the second device.

In some embodiments of the present disclosure, the method 200 may further include: receiving, by the first device, second control information transmitted by the second device, the second control information being not used to schedule transmission of a physical channel. The second control information corresponds to a second feedback bit group and the second feedback bit group corresponds to the first HARQ-ACK codebook, and/or the second control information corresponds to the first control information format and the second control information corresponds to the first HARQ-ACK codebook.

Optionally, the second control information is used to release semi-persistent scheduling configuration, or the second control information is used to activate or deactivate a dormant state of a secondary cell.

It should be understood that in a case that a piece of control information can dynamically schedule multiple physical channels, if the first device does not successfully receive a certain piece of control information, the first device cannot determine how many physical channels are lost, because the first device does not know how many physical channels are scheduled by the lost control information. Therefore, the counting scheme in the related art is no longer applicable to this new scenario, which needs to be further enhanced. In the present disclosure, one scheduling corresponds to a fixed number of physical channels or corresponds to a fixed number of feedback bits (i.e., a physical channel group or a feedback bit group in the present disclosure), and when the first device loses one scheduling, the first device can assume that the number of lost physical channels is the fixed number of the physical channels, so as to avoid ambiguity of the transceiver on the size of the codebook. As an example, the scheduling number count information is C-DAI information, which indicates that the downlink transmission scheduled by the current first DCI corresponds to which physical channel group within the HARQ feedback window.

In some embodiments of the present disclosure, the first control information includes first scheduling count information; and the first scheduling count information indicates: an order position of the first physical channel group in physical channel groups transmitted by the second device within a HARQ feedback window; or an order position of the first feedback bit group in feedback bit groups within a HARQ feedback window; or an order position of the first control information in control information transmitted by the second device within a HARQ feedback window.

It should be noted that in the embodiment of the present disclosure the first physical channel group may be understood as a physical channel group virtualized from the S physical channels, that is, the S physical channels are virtualized into a physical channel group including N physical channels.

Optionally, the first scheduling count information is associated with at least one of: the first physical channel group, the first feedback bit group, or the first control information.

Optionally, the first scheduling count information is used to determine the first HARQ-ACK codebook.

Optionally, the first scheduling count information is used to determine the position of at least one of the S physical channels in the first HARQ-ACK codebook.

Optionally, in a case of a single-carrier, the first scheduling count information is further used to determine the size of the first HARQ-ACK codebook.

In other words, optionally, in a case that the first scheduling count information is included in the first control information, the first device determines the first HARQ-ACK codebook according to the first scheduling count information. For example, the first device sorts the physical channel groups received within the HARQ feedback window according to the first scheduling count information, and determines the position of the HARQ-ACK information corresponding to the physical channel in the first HARQ-ACK codebook according to the ascending order of the physical channel groups.

Optionally, the order position of the first physical channel group in the physical channel groups transmitted by the second device within the HARQ feedback window can be understood as: the first physical channel group is which physical channel group in the physical channel groups transmitted within the HARQ feedback window.

Optionally, the order position of the first feedback bit group in the feedback bit groups within the HARQ feedback window can be understood as: the first feedback bit group is which feedback bit group in the feedback bit groups transmitted within the HARQ feedback window.

Optionally, the order position of the first control information in the control information transmitted by the second device within the HARQ feedback window can be understood as: the first control information is which piece of control information in the pieces of control information transmitted by the second device within the HARQ feedback window.

As an example, the first control information includes first scheduling count information, the first scheduling count information indicates: the first physical channel group is which physical channel group in the physical channel groups transmitted within the HARQ feedback window; or the first feedback bit group is which feedback bit group in the feedback bit groups transmitted within the HARQ feedback window; or the first control information is which piece of control information in the pieces of control information transmitted by the second device within the HARQ feedback window.

Optionally, the physical channel group corresponding to the first scheduling count information is ordered according to the detection opportunity order of the control channel. For example, it is consistent with the detection opportunity order of PDCCH in the related art.

Optionally, the number of bits corresponding to the first scheduling count information is greater than or equal to 2 bits.

As an example, the first control information is first DCI, the first scheduling count information is C-DAI information, C-DAI information corresponds to 2 bits, C-DAI information indicates that the first physical channel group is which physical channel group in the physical channel groups transmitted within the HARQ feedback window. N physical channels are included in the physical channel group. The value of N is fixed. A physical channel group may also be referred to as a downlink transmission group, that is, the downlink transmission group includes N downlink transmissions. The C-DAI information in the first DCI is described below in conjunction with Table 6.

TABLE 6

| 2 bits of DAI information | Value of C-DAI information | $Y \geq 1$, Y represents the downlink transmission scheduled by the current first DCI corresponds to which physical channel group, $T_D = 4$ |
| --- | --- | --- |
| 0, 0 | 1 | $(Y - 1) \bmod T_D + 1 = 1$ |
| 0, 1 | 2 | $(Y - 1) \bmod T_D + 1 = 2$ |
| 1, 0 | 3 | $(Y - 1) \bmod T_D + 1 = 3$ |
| 1, 1 | 4 | $(Y - 1) \bmod T_D + 1 = 4$ |

As shown in Table 6, the value range of C-DAI information is from 1 to 4, and the terminal device determines that the value of C-DAI corresponds to which physical channel group according to the C-DAI information and the reception of downlink transmission. For example, the downlink transmission scheduled by the current first DCI corresponds to the first physical channel group, C-DAI=1, and the terminal device needs to feed back the feedback information corresponding to N downlink transmissions. The downlink transmission scheduled by the current first DCI corresponds to the second physical channel group, C-DAI=2, and the terminal device needs to feed back the feedback information corresponding to 2*N downlink transmissions; the downlink transmission scheduled by the current first DCI corresponds to the third physical channel group, C-DAI=3, and the terminal device needs to feed back the feedback information corresponding to 3*N downlink transmissions; the downlink transmission scheduled by the current first DCI corresponds to the fourth physical channel group, C-DAI=4, and the terminal device needs to feed back the feedback information corresponding to 4*N downlink transmissions; the downlink transmission scheduled by the current first DCI corresponds to the fifth physical channel group, C-DAI=1, and the terminal device needs to feed back the feedback information corresponding to 5*N downlink transmissions; the downlink transmission scheduled by the current first DCI corresponds to the sixth physical channel group, C-DAI=2, and the terminal device needs to feed back the feedback information corresponding to 6*N downlink transmissions; and so on.

In some embodiments of the present disclosure, the first control information includes first scheduling count information and first indication information; and the first scheduling count information indicates: an order position of the first physical channel group in physical channel groups transmitted by the second device within a HARQ feedback window; or an order position of the first feedback bit group in feedback bit groups within a HARQ feedback window; the first indication information indicates an order position of the first control information in control information transmitted by the second device within a HARQ feedback window.

In some embodiments of the present disclosure, the first control information includes first scheduling total number information; and the first scheduling total number information indicates: a total number of physical channel groups that are transmitted until the first physical channel group within a HARQ feedback window; a total number of corresponding feedback bit groups that are counted until the first feedback bit group within a HARQ feedback window; or a total number of pieces of control information that are transmitted by the second device until the first control information within a HARQ feedback window.

Optionally, the first scheduling total number information is associated with at least one of: the first physical channel group, the first feedback bit group, or the first control information.

Optionally, the first scheduling total number information is used to determine the first HARQ-ACK codebook.

Optionally, the first scheduling total number information is used to determine the size of the first HARQ-ACK codebook.

In other words, in a case that the first control information includes the first scheduling total number information, the first device determines the first HARQ-ACK codebook according to the first scheduling total number information. For example, the first device determines how many physical channel groups are received in total based on the first scheduling total number information, and determines the size of the first HARQ-ACK codebook according to the number of physical channel groups.

Optionally, the number of bits corresponding to the first scheduling total number information is greater than or equal to 2 bits.

As an example, the first scheduling total number information is T-DAI information, the T-DAI information corresponds to 2 bits, the T-DAI information indicates the total number of physical channel groups that are transmitted until the first physical channel group within the HARQ feedback window. N physical channels are included in the first physical channel group. The value of N is fixed.

TABLE 7

| 2 bits of T-DAI information | Value of T-DAI information | $Y \geq 1$, Y represents the total number of physical channels that are transmitted until the first physical channel group within the HARQ feedback window, $T_D = 4$ |
| --- | --- | --- |
| 0, 0 | 1 | $(Y - 1) \bmod T_D + 1 = 1$ |
| 0, 1 | 2 | $(Y - 1) \bmod T_D + 1 = 2$ |
| 1, 0 | 3 | $(Y - 1) \bmod T_D + 1 = 3$ |
| 1, 1 | 4 | $(Y - 1) \bmod T_D + 1 = 4$ |

As shown in Table 7, the value range of T-DAI information is from 1 to 4, and the terminal device determines the total number of physical channel groups corresponding to the value of T-DAI according to the T-DAI information and the reception of downlink transmission. For example, 1 physical channel group is included until the downlink transmission scheduled by the current first DCI, T-DAI=1, and the terminal device needs to feed back the feedback information corresponding to N downlink transmissions; 2 physical channel groups are included until the downlink transmission scheduled by the current first DCI, T-DAI=2, and the terminal device needs to feed back the feedback information corresponding to 2*N downlink transmissions; 3 physical channel groups are included until the downlink transmission scheduled by the current first DCI, T-DAI=3, and the terminal device needs to feed back the feedback information corresponding to 3*N downlink transmissions; 4 downlink transmissions are included until the downlink transmission scheduled by the current first DCI, T-DAI=4, and the terminal device needs to feed back the feedback information corresponding to 4*N downlink transmissions; 5 physical channel groups are included until the downlink transmission scheduled by the current first DCI, T-DAI=1, and the terminal device needs to feed back the feedback information corresponding to 5*N downlink transmissions; 6 downlink transmissions are included until the downlink transmission scheduled by the current first DCI, T-DAI=2, and the terminal device needs to feed back the feedback information corresponding to 6*N downlink transmissions information; and so on.

In some embodiments, the first device is a terminal device as an example. A physical channel group corresponding to one piece of DCI includes N physical channels, or a feedback bit group corresponding to one piece of DCI includes feedback bits corresponding to N physical channels. If the terminal device determines that the number of pieces of received DCI is Q, the terminal device determines the size of the HARQ-ACK codebook corresponding to the Q pieces of DCI according to N and Q. Optionally, one piece of DCI is one piece of DCI corresponding to the first DCI format.

For example, if one physical channel corresponds to 1 bit of feedback information, the terminal device determines that the size of the HARQ-ACK codebook corresponding to the Q pieces of DCI is N*Q.

For another example, if one physical channel corresponds to 2 bits of feedback information, the terminal device determines that the size of the HARQ-ACK codebook corresponding to the Q pieces of DCI is 2*N*Q.

In some embodiments, the terminal device determines the number of pieces of received DCI according to the DAI information.

For example, in a single-carrier scenario, the terminal device determines the number of pieces of received DCI according to the C-DAI information.

For example, in a multi-carrier scenario, the terminal device determines the number of pieces of received DCI according to the T-DAI information.

In some embodiments of the present disclosure, the first control information includes first scheduling count information and first scheduling total number information; and the first scheduling count information and the first scheduling total number information jointly indicate: a total number of physical channel groups that are transmitted until the first physical channel group within a HARQ feedback window; a total number of corresponding feedback bit groups that are counted until the first feedback bit group within a HARQ feedback window; or a total number of pieces of control information that are transmitted by the second device until the first control information within a HARQ feedback window.

In some embodiments of the present disclosure, the first control information includes first scheduling count information, first scheduling total number information and first indication information; and the first scheduling count information and the first scheduling total number information jointly indicate: a total number of physical channel groups that are transmitted until the first physical channel group within a HARQ feedback window; a total number of corresponding feedback bit groups that are counted until the first feedback bit group within a HARQ feedback window; the first indication information indicates an order position of the first control information in control information transmitted by the second device within the HARQ feedback window.

In some embodiments of the present disclosure, the first control information includes first group identification indication information, the first group identification indication information indicates a first group, and all of the S physical channels correspond to the first group; or at least one of the S physical channels corresponds to the first group.

Optionally, the number of physical channels included in the first physical channel groups corresponding to different PDSCH group identifications is the same.

Optionally, the number of feedback bits included in the first feedback bit groups corresponding to different PDSCH group identifications is the same.

In some embodiments, the first device is a terminal device as an example. For the first PDSCH group identification, a physical channel group corresponding to one piece of DCI includes N physical channels, or a feedback bit group corresponding to one piece of DCI includes feedback bits corresponding to N physical channels; for the second PDSCH group identification, a physical channel group corresponding to one piece of DCI includes N physical channels, or a feedback bit group corresponding to one piece of DCI includes feedback bits corresponding to N physical channels. If the terminal device determines that the number of pieces of DCI corresponding to the first PDSCH group identification is Q1, and the number of pieces of DCI corresponding to the second PDSCH group identification is Q2, then the terminal device determines the size of the HARQ-ACK codebook corresponding to the first PDSCH group identification according to N and Q1, and the size of the HARQ-ACK codebook corresponding to the second PDSCH group identification according to N and Q2. Optionally, one piece of DCI is one piece of DCI corresponding to the first DCI format.

For example, if one physical channel corresponds to 1 bit of feedback information, the terminal device determines that the size of the HARQ-ACK codebook corresponding to the first PDSCH group identification is N*Q1, and the size of the HARQ-ACK codebook corresponding to the second PDSCH group identification is N*Q2.

For another example, if one physical channel corresponds to 2 bits of feedback information, the terminal device determines that the size of the HARQ-ACK codebook corresponding to the first PDSCH group identification is 2*N*Q1, and the size of the HARQ-ACK codebook corresponding to the second PDSCH group identification is 2*N*Q2.

Optionally, the numbers of the physical channels included in the first physical channel groups corresponding to different PDSCH group identifications are independently configured by the second device.

Optionally, the numbers of the feedback bits included in the first feedback bit groups corresponding to different PDSCH group identifications are independently configured by the second device.

In some embodiments, for the first PDSCH group identification, a physical channel group corresponding to one piece of DCI includes N1 physical channels, or a feedback bit group corresponding to one piece of DCI includes feedback bits corresponding to N1 physical channels; for the second PDSCH group identification, a physical channel group corresponding to one piece of DCI includes N2 physical channels, or a feedback bit group corresponding to one piece of DCI includes feedback bits corresponding to N2 physical channels. If the terminal device determines that the number of pieces of DCI corresponding to the first PDSCH group identification is Q1, and the number of pieces of DCI corresponding to the second PDSCH group identification is Q2, then the terminal device determines the size of the HARQ-ACK codebook corresponding to the first PDSCH group identification according to N1 and Q1, and the size of the HARQ-ACK codebook corresponding to the second PDSCH group identification according to N2 and Q2. Optionally, one DCI is one DCI corresponding to the first DCI format.

For example, if one physical channel corresponds to 1 bit of feedback information, the terminal device determines that the size of the HARQ-ACK codebook corresponding to the first PDSCH group identification is N1*Q1, and the size of the HARQ-ACK codebook corresponding to the second PDSCH group identification is N2*Q2.

For another example, if one physical channel corresponds to 2 bits of feedback information, the terminal device determines that the size of the HARQ-ACK codebook corresponding to the first PDSCH group identification is 2*N1*Q1, and the size of the HARQ-ACK codebook corresponding to the second PDSCH group identification is 2*N2*Q2.

In some embodiments, the terminal device determines the number of pieces of DCI corresponding to the first PDSCH group identification according to the DAI information, and/or, determines the number of pieces of DCI corresponding to the second PDSCH group identification according to the DAI information.

For example, in the single-carrier scenario, the terminal device determines the number of pieces of DCI corresponding to the first PDSCH group identification according to the C-DAI information, and determines the number of DCIs corresponding to the second PDSCH group identification according to the T-DAI information of the non-scheduled group.

For another example, in the multi-carrier scenario, the terminal device determines the number of pieces of DCI corresponding to the first PDSCH group identification according to the T-DAI information, and determines the number of pieces of DCI corresponding to the second PDSCH group identification according to the T-DAI information of the non-scheduled group.

Optionally, at least one of the S physical channels corresponding to the first group includes: a first one of the S physical channels corresponding to the first group, a time interval between the first physical channel and the first feedback resource satisfying a processing timing.

Optionally, the first group identification indication information is used to determine the first HARQ-ACK codebook.

Optionally, the first control information further includes NFI information. The NFI information and the first group identification indication information are used to jointly determine the first HARQ-ACK codebook.

In other words, in a case that the first control information includes PDSCH group identification indication information, the first device determines a HARQ-ACK codebook corresponding to the first group in the first HARQ-ACK codebook according to the first group identification indication information. For example, the first group identification indication information indicates a first group of physical channels, and the first HARQ-ACK codebook includes HARQ-ACK information corresponding to the first group of physical channels.

In one implementation, the first control information further includes first scheduling count information; and the first scheduling count information indicates: an order position of the first physical channel group in physical channel groups that are transmitted within a HARQ feedback window and correspond to the first group; an order position of the first feedback bit group in feedback bit groups that are transmitted within a HARQ feedback window and correspond to the first group; or an order position of the first control information in control information that is transmitted by the second device within a HARQ feedback window and corresponds to the first group.

Optionally, the first scheduling count information is used to determine the first HARQ-ACK codebook.

Optionally, the first scheduling count information is used to determine a position of at least one of the S physical channels in the HARQ-ACK codebook corresponding to the first group included in the first HARQ-ACK codebook.

Optionally, in a case of a single-carrier, the first scheduling count information is further used to determine the size of the HARQ-ACK codebook corresponding to the first group.

In other words, in a case that the first scheduling count information and the first group identification indication information are included in the first control information, the first device determines the first HARQ-ACK codebook according to the first scheduling count information and the first group identification indication information. For example, the first device sorts the physical channel groups that are received within the HARQ feedback window and belong to the first group according to the first scheduling count information, and determines the position of the HARQ-ACK information corresponding to each physical channel group in the HARQ-ACK codebook corresponding to the first group included in the first HARQ-ACK codebook according to the ascending order.

Optionally, the order position of the first physical channel group in the physical channel groups that are transmitted within the HARQ feedback window and correspond to the first group can be understood as: the first physical channel group is which physical channel group in the physical channel groups that are transmitted within the HARQ feedback window and correspond to the first group.

Optionally, the order position of the first feedback bit group in the feedback bit groups that are transmitted within the HARQ feedback window and correspond to the first group can be understood as: the first feedback bit group is which feedback bit group in the feedback bit groups that are transmitted within the HARQ feedback window and correspond to the first group.

Optionally, the order position of the first control information in the control information that is transmitted by the second device within the HARQ feedback window and corresponds to the first group can be understood as: the first control information is which piece of control information in the pieces of control information that are transmitted by the second device within the HARQ feedback window and correspond to the first group.

In another implementation, the first control information further includes first scheduling count information and first indication information; and the first scheduling count information indicates: an order position of the first physical channel group in physical channel groups that are transmitted within a HARQ feedback window and correspond to the first group; or an order position of the first feedback bit group in feedback bit groups that are transmitted within a HARQ feedback window and correspond to the first group; the first indication information indicating an order position of the first control information in control information that is transmitted by the second device within the HARQ feedback window and corresponds to the first group.

In another implementation, the first control information further includes first scheduling total number information; and the first scheduling total number information indicates: a total number of physical channel groups that are transmitted until the first physical channel group within a HARQ feedback window and correspond to the first group; a total number of feedback bit groups that are counted until the first feedback bit group within a HARQ feedback window and correspond to the first group; or a total number of pieces of control information that are transmitted by the second device until the first control information within a HARQ feedback window and correspond to the first group.

Optionally, the first scheduling total number information is used to determine the first HARQ-ACK codebook.

Optionally, the first scheduling total number information is used to determine the size of the HARQ-ACK codebook corresponding to the first group in the first HARQ-ACK codebook.

In other words, in a case that the first control information includes the first scheduling total number information and the first group identification indication information, the first device determines the first HARQ-ACK codebook according to the first scheduling total number information and the first group identification indication information. For example, the first device determines how many physical channel groups belonging to the first group are received in total according to the first scheduling total number information, and determines the size of the HARQ-ACK codebook corresponding to the first group in the first HARQ-ACK codebook according to the number of physical channel groups.

In another implementation, the first control information further includes second scheduling total number information; and the second scheduling total number information indicates a total number of physical channel groups that are transmitted until the first control information within a HARQ feedback window and correspond to the second group, and the second group and the first group are different groups.

Optionally, the second scheduling total number information is used to determine the HARQ-ACK codebook of the second group.

Optionally, the second scheduling total number information is used to determine the size of the HARQ-ACK codebook corresponding to the second group in the first HARQ-ACK codebook.

In other words, in a case that the first control information includes the second scheduling total number information corresponding to the non-scheduled group, the first device determines the HARQ-ACK codebook of the non-scheduled group according to the second scheduling total number information. For example, the first device determines how many physical channel groups belonging to the second group are received in total according to the second scheduling total number information, and determines the size of the HARQ-ACK codebook corresponding to the second group of in the first HARQ-ACK codebook according to the number of physical channel groups.

Optionally, the number of bits corresponding to the second scheduling total number information is greater than or equal to 2 bits.

It should be noted that the first group and the second group here are used to distinguish different objects, and are not used to indicate specific group identifications. For example, the terminal device is configured with two groups, respectively group 1 and group 2, and the first group may refer to group 1 or group 2, and correspondingly the second group may refer to group 2 or group 1.

In some embodiments of the present disclosure, the first control information further includes first scheduling count information and first scheduling total number information; and the first scheduling count information and the first scheduling total number information jointly indicate: a total number of physical channel groups that are transmitted until the first physical channel group within a HARQ feedback window and correspond to the first group; a total number of feedback bit groups that are counted until the first feedback bit group within a HARQ feedback window and correspond to the first group; or a total number of pieces of control information that are transmitted by the second device until the first control information within a HARQ feedback window and correspond to the first group.

In some embodiments of the present disclosure, the first control information further includes first scheduling count information, first scheduling total number information and first indication information; and the first scheduling count information and the first scheduling total number information jointly indicate: a total number of physical channel groups that are transmitted until the first physical channel group within a HARQ feedback window and correspond to the first group; or a total number of feedback bit groups that are counted until the first feedback bit group within a HARQ feedback window and correspond to the first group; the first indication information indicating an order position of the first control information in control information that is transmitted by the second device within the HARQ feedback window and corresponds to the first group.

In some embodiments of the present disclosure, the method 200 may further include: receiving, by the first device, third control information transmitted by the second device, the third control information corresponding to a second control information format, and the second control information format being different from the first control information format, or a maximum number of physical channels of which transmission is schedulable by the second control information format being not M; and determining, by the first device, that the third control information corresponds to a second HARQ-ACK codebook, the second HARQ-ACK codebook being different from the first HARQ-ACK codebook.

In some embodiments, the first control information format includes DCI format 1_1.

In some embodiments, the first control information format does not include DCI format 1_0. That is, the first device receives scheduling of DCI format 1_1 and DCI format 1_0, and the first device feeds back independently for each of DCI format 1_1 and DCI format 1_0.

Description is made below in conjunction with a specific example.

Assume that one piece of DCI corresponding to the first DCI format can schedule the terminal device to receive up to M=8 PDSCHs. One piece of DCI is associated with 4 PDSCHs, where each PDSCH corresponds to 1 bit of HARQ-ACK information, or one piece of DCI is associated with 4 bits of HARQ-ACK information. That is, N=4, or one feedback bit group includes 4 bits of HARQ-ACK information.

FIG. 5 is a schematic diagram showing an example of physical channels scheduled by multiple pieces of control information under a single-carrier scenario according to an embodiment of the present disclosure.

As shown in FIG. 5, for the single-carrier scenario, assume that the network device uses DCI0 to schedule 6 PDSCH transmissions, DCI1 to schedule 3 PDSCH transmissions, and DCI2 to schedule 4 PDSCH transmissions. DCI0, DCI1 and DCI2 all correspond to the first DCI format.

In an optional embodiment, the DCI includes 2 bits of C-DAI information, the C-DAI information indicates PDSCH scheduled by the current DCI corresponds to which PDSCH group within the HARQ feedback window. Correspondingly, the C-DAI information in DCI0 indicates 1, the C-DAI information in DCI1 indicates 2, and the C-DAI information in DCI2 indicates 3. If the terminal device receives the 3 pieces of DCI, namely DCI0, DCI1 and DCI2, the terminal device may determine that it needs to feed back the feedback information corresponding to 3*N PDSCHs.

In an optional embodiment, the HARQ-ACK information corresponding to the feedback bit group is determined according to the number S of scheduled physical channels. If S is smaller than or equal to N, feedback is performed for each physical channel independently; if S is greater than N and S is smaller than or equal to 2*N, bundling feedback is performed for every two adjacent physical channels; if S is greater than 2*N and S is smaller than or equal to 3*N, bundling feedback is performed for every three adjacent physical channels; if S is greater than 3*N and S is smaller than or equal to 4*N, bundling feedback is performed for every four adjacent physical channels, and so on. In this example, the HARQ-ACK codebook fed back by the terminal device includes the information shown in Table 8.

TABLE 8

| Feedback information of bundled decoding results of PDSCH1 and PDSCH2 scheduled by DCI0 | Feedback information of bundled decoding results of PDSCH3 and PDSCH4 scheduled by DCI0 | Feedback information of bundled decoding results of PDSCH5 and PDSCH6 scheduled by DCI0 | NACK |
|---|---|---|---|
| First bit | Second bit | Third bit | Fourth bit |
| Decoding result of PDSCH1 scheduled by DCI1 | Decoding result of PDSCH2 scheduled by DCI1 | Decoding result of PDSCH3 scheduled by DCI1 | NACK |
| Fifth bit | Sixth bit | Seventh bit | Eighth bit |
| Decoding result of PDSCH1 scheduled by DCI2 | Decoding result of PDSCH2 scheduled by DCI2 | Decoding result of PDSCH3 scheduled by DCI2 | Decoding result of PDSCH4 scheduled by DCI2 |
| Ninth bit | Tenth bit | Eleventh bit | Twelfth bit |

In an optional embodiment, the HARQ-ACK information corresponding to the feedback bit group is determined according to the maximum value M of the number of scheduled physical channels. Bundling feedback is performed for every adjacent K physical channels, and the value of K is predefined or configured by the network device or determined according to a predefined rule. For example, K=Ceil(M/N), where Ceil( ) represents a rounding up operation. In this example, the HARQ-ACK codebook fed back by the terminal device includes the information shown in Table 9.

the total number of pieces of DCI that are transmitted by the network device until the current DCI within the HARQ feedback window. Correspondingly, C-DAI information in DCI0 indicates 1, and T-DAI information in DCI0 indicates 2; C-DAI information in DCI1 indicates 2, and T-DAI information in DCI1 indicates 2; C-DAI information in DCI2 indicates 3, and T-DAI information in DCI2 indicates 4; C-DAI information in DCI3 indicates 4, and T-DAI information in DCI3 indicates 4; C-DAI information in DCI4 indicates 5, and T-DAI information in DCI4 indicates 6; C-DAI information in DCI5 indicates 6, and T-DAI

TABLE 9

| Feedback information of bundled decoding results of PDSCH1 and PDSCH2 scheduled by DCI0 | Feedback information of bundled decoding results of PDSCH3 and PDSCH4 scheduled by DCI0 | Feedback information of bundled decoding results of PDSCH5 and PDSCH6 scheduled by DCI0 | NACK |
|---|---|---|---|
| First bit | Second bit | Third bit | Fourth bit |
| Feedback information of bundled decoding results of PDSCH1 and PDSCH2 scheduled by DCI1 | Decoding result of PDSCH3 scheduled by DCI1 | NACK | NACK |
| Fifth bit | Sixth bit | Seventh bit | Eighth bit |
| Feedback information of bundled decoding results of PDSCH1 and PDSCH2 scheduled by DCI2 | Feedback information of bundled decoding results of PDSCH3 and PDSCH4 scheduled by DCI2 | NACK | NACK |
| Ninth bit | Tenth bit | Eleventh bit | Twelfth bit |

Figures 6, 7:
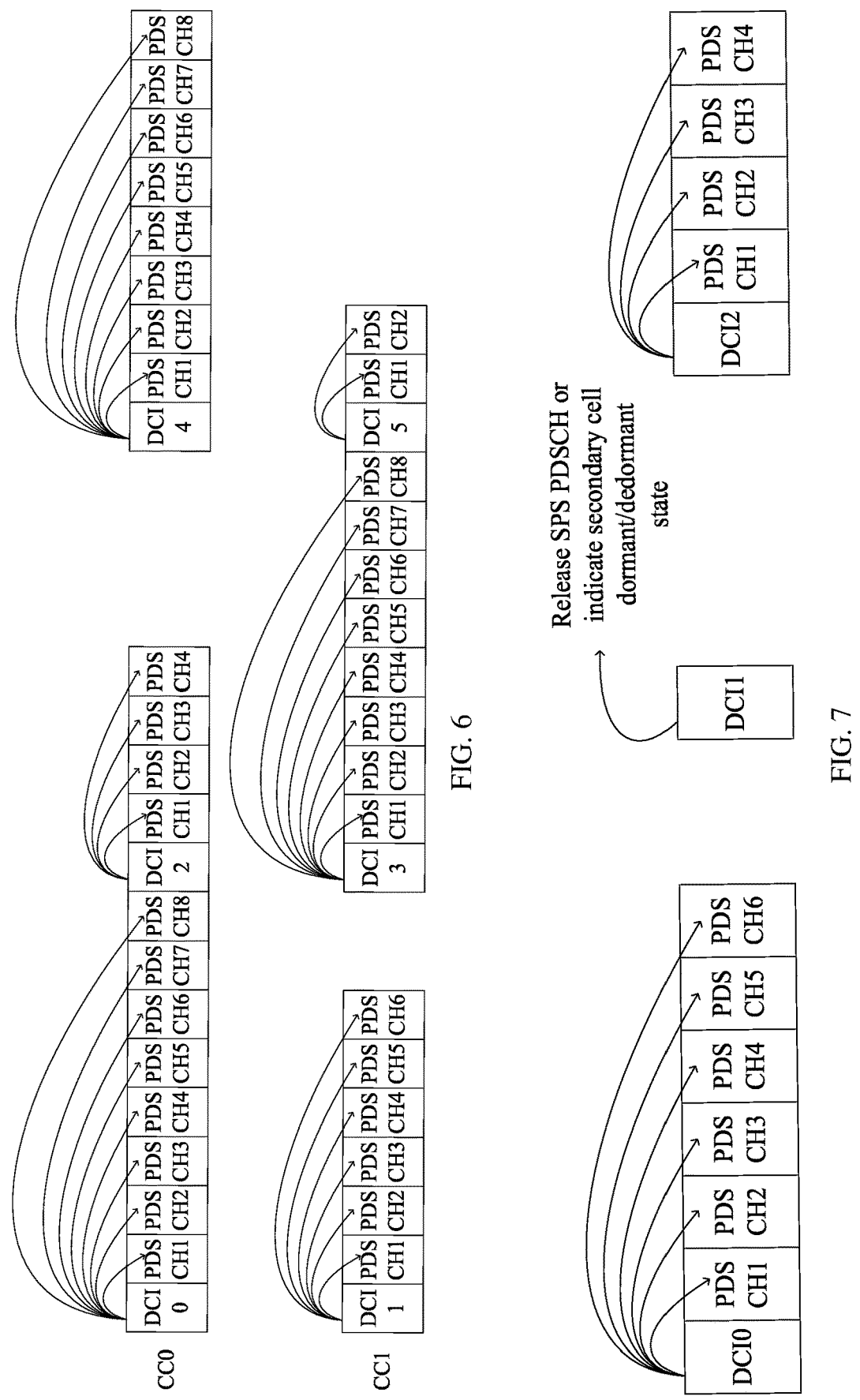
FIG. 6 is a schematic diagram showing an example of physical channels scheduled by multiple pieces of control information under a multiple-carrier scenario according to an embodiment of the present disclosure.
FIG. 7 is a schematic diagram showing an example of feedback of control information corresponding to a first DCI format and scheduling no physical channel according to an embodiment of the present disclosure.

FIG. 6 is a schematic diagram showing an example of physical channels scheduled by multiple pieces of control information under a multiple-carrier scenario according to an embodiment of the present disclosure.

As shown in FIG. 6, for the multi-carrier scenario, assume that in the first PDCCH detection time slot, the network device uses DCI0 to schedule 8 PDSCH transmissions on CC0 and DCI1 to schedule 6 PDSCH transmissions on CC1. In the second PDCCH detection time slot, the network device uses DCI2 to schedule 4 PDSCH transmissions on CC0 and uses DCI3 to schedule 8 PDSCH transmissions on CC1. In the third PDCCH detection time slot, the network device uses DCI4 to schedule 8 PDSCH transmissions on CC0 and uses DCI5 to schedule 2 PDSCH transmissions on CC1. DCI0, DCI1, DCI2, DCI3, DCI4 and DCI5 all correspond to the first DCI format.

In an optional embodiment, the DCI includes 2 bits of C-DAI information and 2 bits of T-DAI information, the C-DAI information indicates that the current DCI is which piece of DCI transmitted by the network device within the HARQ feedback window, the T-DAI information indicates information in DCI5 indicates 6. In this example, if the terminal device loses 4 or more pieces of DCI in a row, there may be an inconsistency between the terminal device and the network device in the understanding of the size of the HARQ-ACK codebook.

In an optional embodiment, the HARQ-ACK information corresponding to the feedback bit group is determined according to the number S of scheduled physical channels. If S is smaller than or equal to N, feedback is performed for each physical channel independently; if S is greater than N and S is smaller than or equal to 2*N, bundling feedback is performed for every two adjacent physical channels; if S is greater than 2*N and S is smaller than or equal to 3*N, bundling feedback is performed for every three adjacent physical channels; if S is greater than 3*N and S is smaller than or equal to 4*N, bundling feedback is performed for every four adjacent physical channels, and so on. In this example, the HARQ-ACK codebook fed back by the terminal device includes the information shown in Table 10.

TABLE 10

| | | | |
|---|---|---|---|
| Feedback information of bundled decoding results of PDSCH1 and PDSCH2 scheduled by DCI0 | Feedback information of bundled decoding results of PDSCH3 and PDSCH4 scheduled by DCI0 | Feedback information of bundled decoding results of PDSCH5 and PDSCH6 scheduled by DCI0 | Feedback information of bundled decoding results of PDSCH7 and PDSCH8 scheduled by DCI0 |
| First bit | Second bit | Third bit | Fourth bit |
| Feedback information of bundled decoding results of PDSCH1 and PDSCH2 scheduled by DCI1 | Feedback information of bundled decoding results of PDSCH3 and PDSCH4 scheduled by DCI1 | Feedback information of bundled decoding results of PDSCH5 and PDSCH6 scheduled by DCI1 | NACK |
| Fifth bit | Sixth bit | Seventh bit | Eighth bit |
| Decoding result of PDSCH1 scheduled by DCI2 | Decoding result of PDSCH2 scheduled by DCI2 | Decoding result of PDSCH3 scheduled by DCI2 | Decoding result of PDSCH4 scheduled by DCI2 |
| Ninth bit | Tenth bit | Eleventh bit | Twelfth bit |
| Feedback information of bundled decoding results of PDSCH1 and PDSCH2 scheduled by DCI3 | Feedback information of bundled decoding results of PDSCH3 and PDSCH4 scheduled by DCI3 | Feedback information of bundled decoding results of PDSCH5 and PDSCH6 scheduled by DCI3 | Feedback information of bundled decoding results of PDSCH7 and PDSCH8 scheduled by DCI3 |
| Thirteenth bit | Fourteenth bit | Fifteenth bit | Sixteenth bit |
| Feedback information of bundled decoding results of PDSCH1 and PDSCH2 scheduled by DCI4 | Feedback information of bundled decoding results of PDSCH3 and PDSCH4 scheduled by DCI4 | Feedback information of bundled decoding results of PDSCH5 and PDSCH6 scheduled by DCI4 | Feedback information of bundled decoding results of PDSCH7 and PDSCH8 scheduled by DCI4 |
| Seventeenth bit | Eighteenth bit | Nineteenth bit | Twentieth bit |
| Decoding result of PDSCH1 scheduled by DCI5 | Decoding result of PDSCH2 scheduled by DCI5 | NACK | NACK |
| Twenty-first bit | Twenty-second bit | Twenty-third bit | Twenty-fourth bit |

In an optional embodiment, the HARQ-ACK information corresponding to the feedback bit group is determined according to the maximum value M of the number of scheduled physical channels. Bundling feedback is performed for every K adjacent physical channels, and the value of K is predefined or configured by network device or determined according to a predefined rule. For example, K=Ceil(M/N), where Ceil( ) represents a rounding up operation. In this example, the HARQ-ACK codebook fed back by the terminal device includes the information shown in Table 11.

TABLE 11

| | | | |
|---|---|---|---|
| Feedback information of bundled decoding results of PDSCH1 and PDSCH2 scheduled by DCI0 | Feedback information of bundled decoding results of PDSCH3 and PDSCH4 scheduled by DCI0 | Feedback information of bundled decoding results of PDSCH5 and PDSCH6 scheduled by DCI0 | Feedback information of bundled decoding results of PDSCH7 and PDSCH8 scheduled by DCI0 |
| First bit | Second bit | Third bit | Fourth bit |
| Feedback information of bundled decoding results of PDSCH1 and PDSCH2 scheduled by DCI1 | Feedback information of bundled decoding results of PDSCH3 and PDSCH4 scheduled by DCI1 | Feedback information of bundled decoding results of PDSCH5 and PDSCH6 scheduled by DCI1 | NACK |
| Fifth bit | Sixth bit | Seventh bit | Eighth bit |
| Decoding result of PDSCH1 scheduled by DCI2 | Decoding result of PDSCH2 scheduled by DCI2 | Decoding result of PDSCH3 scheduled by DCI2 | Decoding result of PDSCH4 scheduled by DCI2 |
| Ninth bit | Tenth bit | Eleventh bit | Twelfth bit |
| Feedback information of bundled decoding results of PDSCH1 and PDSCH2 scheduled by DCI3 | Feedback information of bundled decoding results of PDSCH3 and PDSCH4 scheduled by DCI3 | Feedback information of bundled decoding results of PDSCH5 and PDSCH6 scheduled by DCI3 | Feedback information of bundled decoding results of PDSCH7 and PDSCH8 scheduled by DCI3 |
| Thirteenth bit | Fourteenth bit | Fifteenth bit | Sixteenth bit |
| Feedback information of bundled decoding results of PDSCH1 and PDSCH2 scheduled by DCI4 | Feedback information of bundled decoding results of PDSCH3 and PDSCH4 scheduled by DCI4 | Feedback information of bundled decoding results of PDSCH5 and PDSCH6 scheduled by DCI4 | Feedback information of bundled decoding results of PDSCH7 and PDSCH8 scheduled by DCI4 |
| Seventeenth bit | Eighteenth bit | Nineteenth bit | Twentieth bit |
| Feedback information of bundled decoding results of PDSCH1 and PDSCH2 scheduled by DCI5 | NACK | NACK | NACK |
| Twenty-first bit | Twenty-second bit | Twenty-third bit | Twenty-fourth bit |

FIG. 7 is a schematic diagram showing an example of feedback of control information corresponding to a first DCI format and scheduling no physical channel according to an embodiment of the present disclosure.

In the scenario as shown in FIG. 7, the network device uses DCI0 to schedule 6 PDSCH transmissions, DCI1 to release SPS configuration or indicate a dormant state or non-dormant state of the secondary cell, and uses DCI2 to schedule 4 PDSCH transmissions. DCI0, DCI1 and DCI2 all correspond to the first DCI format.

In an optional embodiment, the DCI includes 2 bits of C-DAI information, the C-DAI information indicates PDSCH scheduled by the current DCI corresponds to which PDSCH group within the HARQ feedback window. Correspondingly, the C-DAI information in DCI0 indicates 1, the C-DAI information in DCI1 indicates 2, and the C-DAI information in DCI2 indicates 3. If the terminal device receives the three pieces of DCI, namely DCI0, DCI1 and DCI2, it needs to feed back the feedback information corresponding to 3*N downlink transmissions.

Here, it is assumed that the HARQ-ACK information corresponding to the feedback bit group is determined according to the maximum value M of the number of scheduled physical channels. Bundling feedback is performed for every K adjacent physical channel, and the value of K is predefined or configured by network device or determined according to a predefined rule. For example, K=Ceil(M/N), where Ceil( ) represents a rounding up operation.

It should be understood that if the terminal device receives DCI1, the terminal device may determine that the feedback information corresponding to DCI1 is ACK.

In an optional embodiment, the HARQ-ACK information corresponding to the control information scheduling no physical channel occupies the feedback position of the first one of the N physical channels. In this example, the HARQ-ACK codebook fed back by the terminal device includes the information shown in Table 12.

TABLE 12

| Feedback information of bundled decoding results of PDSCH1 and PDSCH2 scheduled by DCI0 | Feedback information of bundled decoding results of PDSCH3 and PDSCH4 scheduled by DCI0 | Feedback information of bundled decoding results of PDSCH5 and PDSCH6 scheduled by DCI0 | NACK |
|---|---|---|---|
| First bit | Second bit | Third bit | Fourth bit |
| ACK | NACK | NACK | NACK |
| Fifth bit | Sixth bit | Seventh bit | Eighth bit |
| Feedback information of bundled decoding results of PDSCH1 and PDSCH2 scheduled by DCI2 | Feedback information of bundled decoding results of PDSCH3 and PDSCH4 scheduled by DCI2 | NACK | NACK |
| Ninth bit | Tenth bit | Eleventh bit | Twelfth bit |

In an optional embodiment, the HARQ-ACK information corresponding to the control information scheduling no physical channel is repeatedly transmitted at the feedback position corresponding to each of the N physical channels. In this example, the HARQ-ACK codebook fed back by the terminal device includes the information shown in Table 13.

TABLE 13

| Feedback information of bundled decoding results of PDSCH1 and PDSCH2 scheduled by DCI0 | Feedback information of bundled decoding results of PDSCH3 and PDSCH4 scheduled by DCI0 | Feeback information of bundled decoding results of PDSCH5 and PDSCH6 scheduled by DCI0 | NACK |
|---|---|---|---|
| First bit | Second bit | Third bit | Fourth bit |
| ACK | ACK | ACK | ACK |
| Fifth bit | Sixth bit | Seventh bit | Eighth bit |
| Feeback information of bundled decoding results of PDSCH1 and PDSCH2 scheduled by DCI2 | Feeback information of bundled decoding results of PDSCH3 and PDSCH4 scheduled by DCI2 | NACK | NACK |
| Ninth bit | Tenth bit | Eleventh bit | Twelfth bit |

Based on the analysis of FIG. 5, FIG. 6 and FIG. 7, it can be seen that the solutions provided by the embodiments of the present disclosure can make the terminal device and network device as consistent as possible in the understanding of the size of the HARQ-ACK codebook and the order of the HARQ-ACK codebook. In addition, the overhead of HARQ-ACK feedback can be reduced by using bundling feedback of the HARQ-ACK information corresponding to the physical channels.

An example of an implementation of the first scheduling count information and the first scheduling total number information is illustrated.

In some embodiments of the present disclosure, the first scheduling count information includes Counter-Downlink Assignment Index (C-DAI) information and/or Counter-Sidelink Assignment Index (C-SAI) information.

Optionally, the total number of physical channels counted by the first scheduling total number information is determined according to the detection opportunity order of the control channel. For example, it is consistent with the detection opportunity order of PDCCH in the related art.

Optionally, the total number of physical channels counted by the first scheduling total number information is determined according to a time slot in which the last one of the S physical channels scheduled by the first control information is located.

Optionally, the total number of physical channels counted by the first scheduling total number information is determined according to a time slot in which the first one of the S physical channels scheduled by the first control information is located.

In some embodiments of the present disclosure, the M value is configured by the second device or the network device, or determined according to a high-layer parameter configured by the second device or the network device, or predetermined.

In other words, the maximum number of physical channels that can be scheduled by one piece of control information is configured by the second device or the network device, or predetermined. For example, the first control information format corresponds to a first Time Domain Resource Assignment (TDRA) table, and a maximum number M of schedulable physical channels are included in the first TDRA table.

In some embodiments of the present disclosure, how to interpret an information field in the first control information is determined according to a high-layer parameter configured by a network device, or predetermined, or associated with the first control information format, or associated with the maximum number of physical channels scheduled by the first control information.

For example, the first control information corresponds to the first control information format, the first control information format schedules transmission of the maximum number M of physical channels, where M is a positive integer greater than or equal to 2, and then an interpretation method of an information domain in the first control information may be determined according to the embodiments in the present disclosure; or, the first control information corresponds to the second control information format, the second control information format schedules transmission of a maximum number 1 of physical channel, and then an interpretation method of an information domain in the first control information can be determined according to the related art.

In some embodiments of the present disclosure, a time domain position of the first feedback resource is determined according to a first value in a HARQ feedback timing set, and the HARQ feedback timing set includes at least two values and HARQ feedback timing indication information included in the first control information indicates the first value; or the HARQ feedback timing set includes only the first value, and the first control information does not include HARQ feedback timing indication information.

In other words, the time domain position of the first feedback resource is determined according to the HARQ feedback timing indication information in the first control information, and the HARQ feedback timing indication information indicates a value in the HARQ feedback timing set; or, the time domain position of the first feedback resource is determined according to the HARQ feedback timing set, and the first control information does not include HARQ feedback timing indication information, and/or, the HARQ feedback timing set includes only one value.

Optionally, the HARQ feedback timing set is configured via higher-layer parameters, or predetermined.

Optionally, the K1 value in the HARQ feedback timing set is associated with the M value, or determined according to the M value. For example, when a network device configures a value included in the HARQ feedback timing set via a high-layer parameter, it also needs to consider the M value.

Optionally, the HARQ feedback timing set includes at least one K1 value. If only one K1 value is included in the HARQ feedback timing set, the HARQ feedback timing indication information may not be included in DCI, and a time domain position of the HARQ feedback resource is determined according to the K1 value in the HARQ feedback timing set; and if multiple K1 values are included in the HARQ feedback timing set, the number of bits corresponding to the HARQ feedback timing indication information included in DCI is determined according to the number of K1 values included in the HARQ feedback timing set.

Optionally, the first value is K1 (i.e., the HARQ feedback timing indication information in the first control information indicates K1 included in the HARQ feedback timing set, or, the HARQ feedback timing set includes only one K1 value and the first control information does not include the HARQ feedback timing indication information), where K1 is greater than or equal to 0. A time slot in which the first feedback resource is located is determined based on one of the following:

when an end position of the last one of the S physical channels is in time slot n, the first feedback resource is located in time slot n+K1;

when an end position of the first one of the S physical channels is in time slot n, the first feedback resource is located in time slot n+K1; or when an end position of the first control information is in time slot n, the first feedback resource is located in time slot n+K1.

Optionally, the first value is K1, where K1 is greater than or equal to 0. A time slot in which the first feedback resource is located is determined based on one of the following:

when an end position of the last one of the S physical channels is in time slot n, the first feedback resource is located in time slot n+K1;

when an end position of the first one of the S physical channels is in time slot n, the first feedback resource is located in time slot n+K1;

when an end position of the first control information is in time slot n, the first feedback resource is located in time slot n+K1;

an end position of the first one of the S physical channels is in time slot n, and the first feedback resource is located in time slot n+K1, the first physical channel including a physical channel in the S physical channels that has a time interval with the first feedback resource which satisfies a processing timing;

an end position of the second one of the S physical channels is in time slot n, and the first feedback resource is located in time slot n+K1, the second physical channel being the latest physical channel in the S physical channels that has a time interval with the first feedback resource which satisfies a processing timing;

the S physical channels include at least two physical channels, the at least two physical channels are used to transmit a same Transport Block (TB), an end position of the last one of the at least two physical channels is in time slot n, and the first feedback resource is located in time slot n+K1; or the S physical channels include at least two physical channels, the at least two physical channels are used to transmit different Transport Blocks (TBs), an end position of the last one of the at least two physical channels is in time slot n, and the first feedback resource is located in time slot n+K1.

As an example, a network device uses DCI0 to schedule 4 PDSCH transmissions, which include PDSCH0, PDSCH1, PDSCH2, and PDSCH3. DCI0 and PDSCH0 are in time slot n, PDSCH1 is in time slot n+1, PDSCH2 is in time slot n+2, and PDSCH3 is in time slot n+3. The HARQ feedback timing indication information in DCI0 indicates 5, i.e. K1=5, included in the HARQ feedback timing set. The decoding results of PDSCH0, PDSCH1, PDSCH2 and PDSCH3 correspond to the first HARQ-ACK codebook, and the first HARQ-ACK codebook corresponds to the first feedback resource.

In some optional embodiments, the terminal device determines that the first feedback resource is located in time slot n+8 according to the end position of the last one of the four physical channels scheduled by DCI0 being in time slot n+3.

In some optional embodiments, the terminal device determines that the first feedback resource is located in time slot n+5 according to the end position of the first one of the four physical channels scheduled by DCI0 being in time slot n.

In some optional embodiments, the terminal device determines that the first feedback resource is located in time slot n+5 according to the end position of DCI0 being in time slot n.

In some embodiments of the present disclosure, at least two of the M physical channels correspond to different Transport Blocks (TBs); or when S is greater than or equal to 2, at least two of the S physical channels correspond to different TBs.

In some embodiments of the present disclosure, the first device includes a terminal device, and the second device includes a network device; or the first device includes a first terminal device, and the second device includes a second terminal device.

The preferred embodiments of the present disclosure have been described in detail above with reference to the accompanying drawings. However, the present disclosure is not limited to the specific details of the above embodiments. Various simple modifications can be made to the technical solutions of the present disclosure without departing from the scope of the technical concept of the present disclosure. These simple modifications all belong to the protection scope of the present disclosure. For example, the specific technical features described in the above specific embodiments can be combined as appropriate provided that they do not conflict. In order to avoid unnecessary repetition, the description of various possible combinations will be omitted here. In another example, the embodiments of the present disclosure can also be combined as appropriate, as long as they do not violate the concept of the present disclosure, and they should also be regarded as the content disclosed in the present disclosure. In yet another example, the embodiments of the present disclosure and/or technical features therein can be combined with the prior art as appropriate, provided that they do not conflict, and the resulting technical solutions are to be encompassed by the scope of the present disclosure.

It should also be understood that, in the method embodiments of the present disclosure, the values of the sequence numbers of the above processes do not mean the order of execution, and the execution order of each process should be determined by its functions and internal logics, and the implementation of the present disclosure is not limited to any specific order. In addition, in the embodiments of the present disclosure, the terms "downlink" and "uplink" are used to indicate the transmission direction of signals or data. Here, "downlink" is used to indicate that the transmission direction of signals or data is a first direction from a station to a user equipment of a cell, and "uplink" is used to indicate that the transmission direction of signals or data is a second direction from a user equipment in a cell to a station. For example, a "downlink signal" indicates that the transmission direction of the signal is the first direction. In addition, in this embodiment of the present disclosure, the term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The apparatus embodiments of the present disclosure will be described in detail below with reference to FIG. 8 to FIG. 11.

Figure 8:
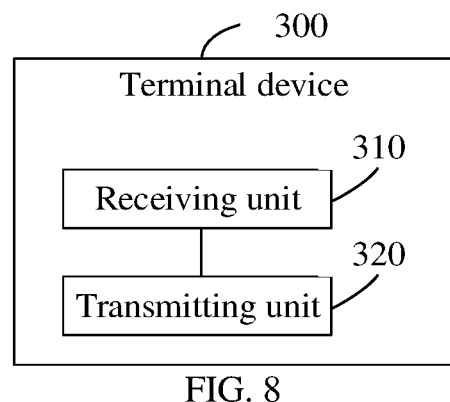
FIG. 8 is a schematic block diagram of a first device according to an embodiment of the present disclosure.

FIG. 8 shows a schematic block diagram of a first device 300 according to an embodiment of the present disclosure.

As shown in FIG. 8, the first device 300 includes a receiving unit 310 and a transmitting unit 320.

The receiving unit 310 is configured to receive first control information transmitted by a second device, the first control information being used to schedule transmission of S physical channels, at least one of the S physical channels corresponding to a first physical channel group or a first feedback bit group, the first physical channel group or the first feedback bit group corresponding to a first Hybrid Automatic Repeat reQuest-Acknowledgement (HARQ-ACK) codebook, the first HARQ-ACK codebook corresponding to a first feedback resource, the first control information corresponding to a first control information format, and transmission of a maximum number M of physical channels being schedulable by the first control information format, where M is a positive integer greater than or equal to 2, and S is a positive integer greater than or equal to 1 and smaller than or equal to M; and The transmitting unit 320 is configured to transmit the first HARQ-ACK codebook via the first feedback resource.

In some embodiments of the present disclosure, the first physical channel group includes N physical channels, where N is a positive integer greater than or equal to 1; and/or N is a positive integer smaller than or equal to M.

In some embodiments of the present disclosure, the first feedback bit group includes feedback bits of N physical channels, where N is a positive integer greater than or equal to 1; and/or N is a positive integer smaller than or equal to M.

In some embodiments of the present disclosure, the first device is configured with a spatial division bundling feedback mode, and each of the N physical channels corresponds to 1 bit of feedback information.

In some embodiments of the present disclosure, S is smaller than or equal to N; and feedback bit positions of the first S physical channels in feedback bit positions corresponding to the first physical channel group are respectively feedback bit positions of the S physical channels, or feedback bit positions of the first S physical channels in feedback bit positions of the first feedback bit group are respectively feedback bit positions of the S physical channels.

In some embodiments of the present disclosure, S is greater than N; and a feedback bit position of one physical channel in feedback bit positions corresponding to the first physical channel group is a feedback bit position of at least two of the S physical channels adopting bundling feedback, or a feedback bit position of one physical channel in feedback bit positions of the first feedback bit group is a feedback bit position of at least two of the S physical channels adopting bundling feedback.

In some embodiments of the present disclosure, S is greater than (K−1)*N and smaller than or equal to K*N, where K is a positive integer; and a feedback bit position of one physical channel in feedback bit positions corresponding to the first physical channel group is a feedback bit position of K of the S physical channels adopting bundling feedback, or a feedback bit position of one physical channel in feedback bit positions of the first feedback bit group is a feedback bit position of K of the S physical channels adopting bundling feedback.

In some embodiments of the present disclosure, M is greater than N; and a feedback bit position of one physical channel in feedback bit positions corresponding to the first physical channel group is a feedback bit position of at least two of the M physical channels adopting bundling feedback, or a feedback bit position of one physical channel in feedback bit positions of the first feedback bit group is a feedback bit position of at least two of the M physical channels adopting bundling feedback.

In some embodiments of the present disclosure, a feedback bit position of one physical channel in feedback bit positions corresponding to the first physical channel group is a feedback bit position of Ceil (M/N) of the M physical channels adopting bundling feedback; or a feedback bit position of one physical channel in feedback bit positions of the first feedback bit group is a feedback bit position of Ceil (M/N) of the M physical channels adopting bundling feedback, where Ceil ( ) represents a rounding up operation.

In some embodiments of the present disclosure, the at least two physical channels are K physical channels, where a value of K is predefined, or determined according to a predefined rule, or configured by the second device.

In some embodiments of the present disclosure, when feedback information of all of the at least two physical channels is ACK, feedback information of the at least two physical channels is ACK; and/or when feedback information of any of the at least two physical channels is NACK, feedback information of the at least two physical channels is NACK.

In some embodiments of the present disclosure, a value of N is predefined, or determined according to a predefined rule, or configured by the second device.

In some embodiments of the present disclosure, the receiving unit 310 is further configured to receive second control information transmitted by the second device, the second control information being not used to schedule transmission of a physical channel; and the second control information corresponding to a second feedback bit group and the second feedback bit group corresponding to the first HARQ-ACK codebook, and/or the second control information corresponding to the first control information format and the second control information corresponding to the first HARQ-ACK codebook.

In some embodiments of the present disclosure, the second control information is used to release semi-persistent scheduling configuration, or the second control information is used to activate or deactivate a dormant state of a secondary cell.

In some embodiments of the present disclosure, the first control information includes first scheduling count information; and the first scheduling count information indicates: an order position of the first physical channel group in physical channel groups transmitted by the second device within a HARQ feedback window; or an order position of the first feedback bit group in feedback bit groups within a HARQ feedback window; or an order position of the first control information in control information transmitted by the second device within a HARQ feedback window.

In some embodiments of the present disclosure, the first control information includes first scheduling total number information; and the first scheduling total number information indicates: a total number of physical channel groups that are transmitted until the first physical channel group within a HARQ feedback window; a total number of corresponding feedback bit groups that are counted until the first feedback bit group within a HARQ feedback window; or a total number of pieces of control information that are transmitted by the second device until the first control information within a HARQ feedback window.

In some embodiments of the present disclosure, the first control information includes a first group identification indication information, the first group identification indication information indicates a first group, and all of the S physical channels correspond to the first group; or at least one of the S physical channels corresponds to the first group.

In some embodiments of the present disclosure, the first control information further includes first scheduling count information; and the first scheduling count information indicates: an order position of the first physical channel group in physical channel groups that are transmitted within a HARQ feedback window and correspond to the first group; an order position of the first feedback bit group in feedback bit groups that are transmitted within a HARQ feedback window and correspond to the first group; or an order position of the first control information in control information that is transmitted by the second device within a HARQ feedback window and corresponds to the first group.

In some embodiments of the present disclosure, the first control information further includes first scheduling total number information; and the first scheduling total number information indicates: a total number of physical channel groups that are transmitted until the first physical channel group within a HARQ feedback window and correspond to the first group; a total number of feedback bit groups that are counted until the first feedback bit group within a HARQ feedback window and correspond to the first group; or a total number of pieces of control information that are transmitted by the second device until the first control information within a HARQ feedback window and correspond to the first group.

In some embodiments of the present disclosure, the first control information further includes second scheduling total number information; and the second scheduling total number information indicates a total number of physical channel groups that are transmitted until the first control information within a HARQ feedback window and correspond to the second group, and the second group and the first group are different groups.

In some embodiments of the present disclosure, the first scheduling count information includes Counter-Downlink Assignment Index (C-DAI) information and/or Counter-Sidelink Assignment Index (C-SAI) information.

In some embodiments of the present disclosure, the first scheduling total information includes Total-Downlink Assignment Index (T-DAI) information and/or Total-Sidelink Assignment Index (T-SAI) information.

In some embodiments of the present disclosure, the receiving unit 310 is further configured to receive third control information transmitted by the second device, the third control information corresponding to a second control information format, and the second control information format being different from the first control information format, or a maximum number of physical channels of which transmission is schedulable by the second control information format being not M; and determine that the third control information corresponds to a second HARQ-ACK codebook, the second HARQ-ACK codebook being different from the first HARQ-ACK codebook.

In some embodiments of the present disclosure, an interpretation method of an information field in the first control information is determined according to a high-layer parameter configured by a network device, or predetermined, or associated with the first control information format, or associated with the maximum number of physical channels scheduled by the first control information.

In some embodiments of the present disclosure, the at least one of the S physical channels includes all of the S physical channels; or the at least one of the S physical channels includes a first one of the S physical channels, a time interval between the first physical channel and the first feedback resource satisfying a processing timing.

In some embodiments of the present disclosure, the time interval between the first physical channel and the first feedback resource satisfying the processing timing includes: a time interval between an end position of the first physical channel and a start position of the first feedback resource satisfying a processing timing, or a time interval between an end position of the first physical channel and a start position of the first feedback resource being greater than or equal to a predetermined value.

In some embodiments of the present disclosure, a time domain position of the first feedback resource is determined according to a first value in a HARQ feedback timing set, and the HARQ feedback timing set includes at least two values and HARQ feedback timing indication information included in the first control information indicates the first value; or the HARQ feedback timing set includes only the first value, and the first control information does not include HARQ feedback timing indication information.

In some embodiments of the present disclosure, the first value is K1, where K1 is greater than or equal to 0, and a time slot in which the first feedback resource is located is determined based on one of the following: when an end position of the last one of the S physical channels is in time slot n, the first feedback resource is located in time slot n+K1; when an end position of the first one of the S physical channels is in time slot n, the first feedback resource is located in time slot n+K1; or when an end position of the first control information is in time slot n, the first feedback resource is located in time slot n+K1.

In some embodiments of the present disclosure, at least two of the M physical channels correspond to different Transport Blocks (TBs); or when S is greater than or equal to 2, at least two of the S physical channels correspond to different TBs.

In some embodiments of the present disclosure, the first device includes a terminal device, and the second device includes a network device; or the first device includes a first terminal device, and the second device includes a second terminal device.

Figure 9:
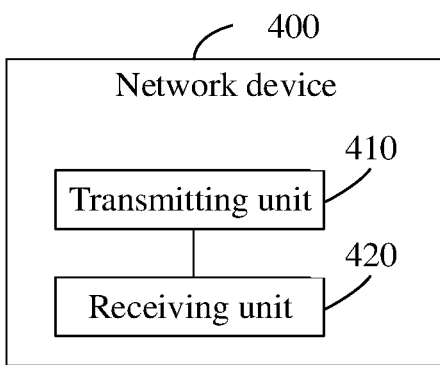
FIG. 9 is a schematic block diagram of a second device according to an embodiment of the present disclosure.

FIG. 9 shows a schematic block diagram of a second device 400 according to an embodiment of the present disclosure.

As shown in FIG. 9, the second device 400 includes: a transmitting unit 410 and a receiving unit 420.

The transmitting unit 410 is configured to transmit first control information to a first device, the first control information being used to schedule transmission of S physical channels, at least one of the S physical channels corresponding to a first physical channel group or a first feedback bit group, the first physical channel group or the first feedback bit group corresponding to a first Hybrid Automatic Repeat reQuest-Acknowledgement (HARQ-ACK) codebook, the first HARQ-ACK codebook corresponding to a first feedback resource, the first control information corresponding to a first control information format, and transmission of a maximum number M of physical channels being schedulable by the first control information format, where M is a positive integer greater than or equal to 2, and S is a positive integer greater than or equal to 1 and smaller than or equal to M.

The receiving unit 420 is configured to receive the first HARQ-ACK codebook via the first feedback resource.

In some embodiments of the present disclosure, the first physical channel group includes N physical channels, where N is a positive integer greater than or equal to 1; and/or N is a positive integer smaller than or equal to M.

In some embodiments of the present disclosure, the first feedback bit group includes feedback bits of N physical channels, where N is a positive integer greater than or equal to 1; and/or N is a positive integer smaller than or equal to M.

In some embodiments of the present disclosure, the first device is configured with a spatial division bundling feedback mode, and each of the N physical channels corresponds to 1 bit of feedback information.

In some embodiments of the present disclosure, S is smaller than or equal to N; and feedback bit positions of the first S physical channels in feedback bit positions corresponding to the first physical channel group are respectively feedback bit positions of the S physical channels, or feedback bit positions of the first S physical channels in feedback bit positions of the first feedback bit group are respectively feedback bit positions of the S physical channels.

In some embodiments of the present disclosure, S is greater than N; and a feedback bit position of one physical channel in feedback bit positions corresponding to the first physical channel group is a feedback bit position of at least two of the S physical channels adopting bundling feedback, or a feedback bit position of one physical channel in feedback bit positions of the first feedback bit group is a feedback bit position of at least two of the S physical channels adopting bundling feedback.

In some embodiments of the present disclosure, S is greater than (K−1)*N and smaller than or equal to K*N, where K is a positive integer; and a feedback bit position of one physical channel in feedback bit positions corresponding to the first physical channel group is a feedback bit position of K of the S physical channels adopting bundling feedback, or a feedback bit position of one physical channel in feedback bit positions of the first feedback bit group is a feedback bit position of K of the S physical channels adopting bundling feedback.

In some embodiments of the present disclosure, M is greater than N; and a feedback bit position of one physical channel in feedback bit positions corresponding to the first physical channel group is a feedback bit position of at least two of the M physical channels adopting bundling feedback, or a feedback bit position of one physical channel in feedback bit positions of the first feedback bit group is a feedback bit position of at least two of the M physical channels adopting bundling feedback.

In some embodiments of the present disclosure, a feedback bit position of one physical channel in feedback bit positions corresponding to the first physical channel group is a feedback bit position of Ceil (M/N) of the M physical channels adopting bundling feedback; or a feedback bit position of one physical channel in feedback bit positions of the first feedback bit group is a feedback bit position of Ceil (M/N) of the M physical channels adopting bundling feedback, where Ceil ( ) represents a rounding up operation.

In some embodiments of the present disclosure, the at least two physical channels are K physical channels, where a value of K is predefined, or determined according to a predefined rule, or configured by the second device.

In some embodiments of the present disclosure, when feedback information of all of the at least two physical channels is ACK, feedback information of the at least two physical channels is ACK; and/or when feedback information of any of the at least two physical channels is NACK, feedback information of the at least two physical channels is NACK.

In some embodiments of the present disclosure, a value of N is predefined, or determined according to a predefined rule, or configured by the second device.

In some embodiments of the present disclosure, the transmitting unit 410 is further configured to transmit second control information to the first device, the second control information being not used to schedule transmission of a physical channel; and the second control information corresponding to a second feedback bit group and the second feedback bit group corresponding to the first HARQ-ACK codebook, and/or the second control information corresponding to the first control information format and the second control information corresponding to the first HARQ-ACK codebook.

In some embodiments of the present disclosure, the second control information is used to release semi-persistent scheduling configuration, or the second control information is used to activate or deactivate a dormant state of a secondary cell.

In some embodiments of the present disclosure, the first control information includes first scheduling count information; and the first scheduling count information indicates: an order position of the first physical channel group in physical channel groups transmitted by the second device within a HARQ feedback window; or an order position of the first feedback bit group in feedback bit groups within a HARQ feedback window; or an order position of the first control information in control information transmitted by the second device within a HARQ feedback window.

In some embodiments of the present disclosure, the first control information includes first scheduling total number information; and the first scheduling total number information indicates: a total number of physical channel groups that are transmitted until the first physical channel group within a HARQ feedback window; a total number of corresponding feedback bit groups that are counted until the first feedback bit group within a HARQ feedback window; or a total number of pieces of control information that are transmitted by the second device until the first control information within a HARQ feedback window.

In some embodiments of the present disclosure, the first control information includes first group identification indication information, the first group identification indication information indicates a first group, and all of the S physical channels correspond to the first group; or at least one of the S physical channels corresponds to the first group.

In some embodiments of the present disclosure, the first control information further includes first scheduling count information; and the first scheduling count information indicates: an order position of the first physical channel group in physical channel groups that are transmitted within a HARQ feedback window and correspond to the first group; an order position of the first feedback bit group in feedback bit groups that are transmitted within a HARQ feedback window and correspond to the first group; or an order position of the first control information in control information that is transmitted by the second device within a HARQ feedback window and corresponds to the first group.

In some embodiments of the present disclosure, the first control information further includes first scheduling total number information; and the first scheduling total number information indicates: a total number of physical channel groups that are transmitted until the first physical channel group within a HARQ feedback window and correspond to the first group; a total number of feedback bit groups that are counted until the first feedback bit group within a HARQ feedback window and correspond to the first group; or a total number of pieces of control information that are transmitted by the second device until the first control information within a HARQ feedback window and correspond to the first group.

In some embodiments of the present disclosure, the first control information further includes second scheduling total number information; and the second scheduling total number information indicates a total number of physical channel groups that are transmitted until the first control information within a HARQ feedback window and correspond to the second group, and the second group and the first group are different groups.

In some embodiments of the present disclosure, the first scheduling count information includes Counter-Downlink Assignment Index (C-DAI) information and/or Counter-Sidelink Assignment Index (C-SAI) information.

In some embodiments of the present disclosure, the first scheduling total information includes Total-Downlink Assignment Index (T-DAI) information and/or Total-Sidelink Assignment Index (T-SAI) information.

In some embodiments of the present disclosure, the transmitting unit 410 is further configured to transmit third control information to the first device, the third control information corresponding to a second control information format, and the second control information format being different from the first control information format, or a maximum number of physical channels of which transmission is schedulable by the second control information format being not M; and determine that the third control information corresponds to a second HARQ-ACK codebook, the second HARQ-ACK codebook being different from the first HARQ-ACK codebook.

In some embodiments of the present disclosure, an interpretation method of an information field in the first control information is determined according to a high-layer parameter configured by a network device, or predetermined, or associated with the first control information format, or associated with the maximum number of physical channels scheduled by the first control information.

In some embodiments of the present disclosure, the at least one of the S physical channels includes all of the S physical channels; or the at least one of the S physical channels includes a first one of the S physical channels, a time interval between the first physical channel and the first feedback resource satisfying a processing timing.

In some embodiments of the present disclosure, the time interval between the first physical channel and the first feedback resource satisfying the processing timing includes: a time interval between an end position of the first physical channel and a start position of the first feedback resource satisfying a processing timing, or a time interval between an end position of the first physical channel and a start position of the first feedback resource being greater than or equal to a predetermined value.

In some embodiments of the present disclosure, a time domain position of the first feedback resource is determined according to a first value in a HARQ feedback timing set, and the HARQ feedback timing set includes at least two values and HARQ feedback timing indication information included in the first control information indicates the first value; or the HARQ feedback timing set includes only the first value, and the first control information does not include HARQ feedback timing indication information.

In some embodiments of the present disclosure, the first value is K1, where K1 is greater than or equal to 0, and a time slot in which the first feedback resource is located is determined based on one of the following: when an end position of the last one of the S physical channels is in time slot n, the first feedback resource is located in time slot n+K1; when an end position of the first one of the S physical channels is in time slot n, the first feedback resource is located in time slot n+K1; or when an end position of the first control information is in time slot n, the first feedback resource is located in time slot n+K1.

In some embodiments of the present disclosure, at least two of the M physical channels correspond to different Transport Blocks (TBs); or when S is greater than or equal to 2, at least two of the S physical channels correspond to different TB s.

In some embodiments of the present disclosure, the first device includes a terminal device, and the second device includes a network device; or the first device includes a first terminal device, and the second device includes a second terminal device.

It should be understood that device embodiments and method embodiments may correspond to each other, and similar descriptions may refer to method embodiments. Specifically, the first device 300 shown in FIG. 8 may correspond to the corresponding entity performing the method 200 in the embodiment of the present disclosure, and the above and other operations and/or functions of the respective units in the first device 300 are provided for the purpose of implementing the process flow in the method shown in FIG. 2, and similarly, the second device 400 shown in FIG. 9 may correspond to the corresponding entity performing the method 200 in the embodiment of the present disclosure, and the above and other operations and/or functions of the respective units in the second device 400 are provided for the purpose of implementing the process flow in the method shown in FIG. 2; and details thereof will be not omitted here for brevity.

The communication device according to the embodiment of the present disclosure has been described above from the perspective of functional modules with reference to the accompanying drawings. It should be understood that the functional modules can be implemented in the form of hardware, software instructions, or a combination of hardware and software modules.

Specifically, the steps of the method embodiments in the embodiments of the present disclosure may be implemented by hardware integrated logic circuits in the processor and/or software instructions, and the steps of the methods disclosed in conjunction with the embodiments of the present disclosure may be directly embodied as implemented by a hardware decoding processor or a combination of hardware and software modules in a decoding processor.

Optionally, the software modules may be located in a random access memory, a flash memory, a read-only memory, a programmable read-only memory, an electrically erasable programmable memory, a register, and other storage media known in the art. The storage medium is located in the memory, and the processor reads the information in the memory, and performs the steps in the above method embodiments in combination with its hardware.

For example, the processing unit and the communication unit above may be implemented by a processor and a transceiver, respectively.

Figure 10:
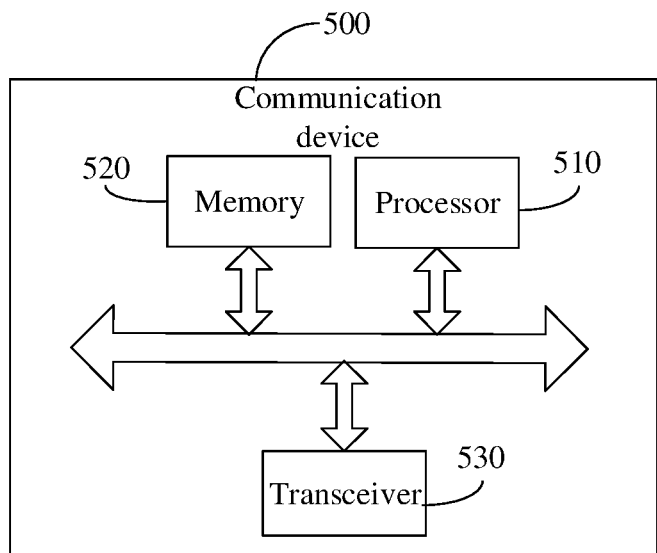
FIG. 10 is a schematic block diagram of a communication device according to an embodiment of the present disclosure.

FIG. 10 is a schematic diagram showing a structure of a communication device 500 according to an embodiment of the present disclosure.

As shown in FIG. 10, the communication device 500 includes a processor 510.

Here, the processor 510 can invoke and execute a computer program from a memory to implement the method in the embodiment of the present disclosure.

Referring to FIG. 10 again, the communication device 500 may further include a memory 520.

Here, the memory 520 may store indication information, and may further store codes, instructions, etc. to be executed by the processor 510. The processor 510 can invoke and execute a computer program from the memory 520 to implement the method in the embodiment of the present disclosure. The memory 520 may be a separate device independent from the processor 510, or may be integrated in the processor 510.

Referring to FIG. 10 again, the communication device 500 may further include a transceiver 530.

Here, the processor 510 may control the transceiver 530 to communicate with other devices, and in particular, transmit information or data to other devices, or receive information or data transmitted by other devices. The transceiver 530 may include a transmitter and a receiver. The transceiver 530 may further include one or more antennas.

It can be appreciated that the components in the communication device 500 may be connected via a bus system. Here, the bus system may include a power bus, a control bus and a status signal bus, in addition to a data bus.

It can be appreciated that the communication device 500 may be the first device according to the embodiment of the present disclosure, and the communication device 500 may implement the corresponding processes implemented by the first device in any of the methods according to the embodiments of the present disclosure. That is, the communication device 500 in the embodiment of the present disclosure may correspond to the first device 300 in the embodiment of the present disclosure, and may correspond to the corresponding entity that performs the method according to the embodiment of the present disclosure. The transceiver 503 here may correspond to the operations and/or functions implemented by the receiving unit 310 and the transmitting unit 320 in the first device 300. For the sake of brevity, details thereof will be omitted here. Similarly, the communication device 500 may be the second device according to the embodiment of the present disclosure, and the communication device 500 may implement the corresponding processes implemented by the second device in any of the methods according to the embodiments of the present disclosure. That is, the communication device 500 in the embodiment of the present disclosure may correspond to the second device 400 in the embodiment of the present disclosure, and may correspond to the corresponding entity that performs the method according to the embodiment of the present disclosure. The transceiver 503 here may correspond to the operations and/or functions implemented by the transmitting unit 410 and the receiving unit 420 in the second device 400. For the sake of brevity, details thereof will be omitted here.

In addition, an embodiment of the present disclosure also provides a chip.

For example, the chip may be an integrated circuit chip, which has a signal processing capability, and can implement or perform any of the methods, steps, and logic block diagrams disclosed in the embodiments of the present disclosure. The chip may also be referred to as a system level chip, a system chip, a chip system, a system-on-a-chip, or the like. Optionally, the chip can be applied in various communication devices, such that the communication device installed with the chip can perform the methods, steps and logic block diagrams disclosed in the embodiments of the present disclosure.

Figure 11:
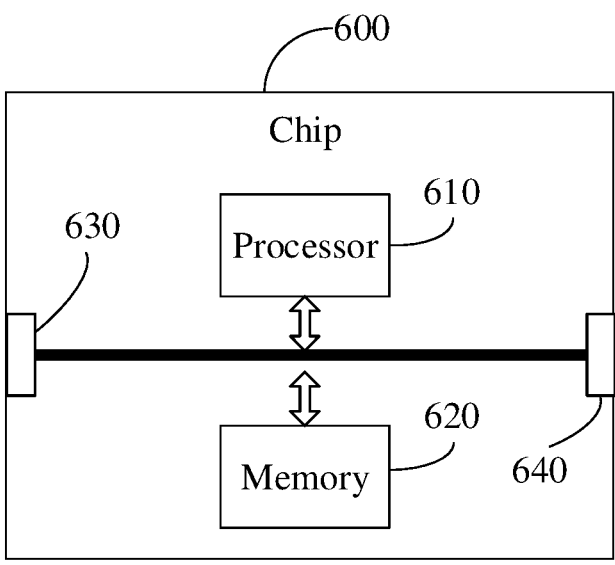
FIG. 11 is a schematic block diagram of a chip according to an embodiment of the present disclosure.

FIG. 11 is a schematic diagram showing a structure of a chip 600 according to an embodiment of the present disclosure.

As shown in FIG. 11, the chip 600 includes a processor 610.

Here, the processor 610 can invoke and execute a computer program from a memory to implement the method in the embodiment of the present disclosure.

Referring to FIG. 11 again, the chip 600 may further include a memory 620.

Here, the processor 610 can invoke and execute a computer program from the memory 620 to implement the method in the embodiment of the present disclosure. The memory 620 may store indication information, and may further store codes, instructions, etc. to be executed by the processor 610. The memory 620 may be a separate device independent from the processor 610, or may be integrated in the processor 610.

Referring to FIG. 11 again, the chip 600 may further include an input interface 630.

Here, the processor 610 can control the input interface 630 to communicate with other devices or chips, and in particular, obtain information or data transmitted by other devices or chips.

Referring to FIG. 11 again, the chip 600 may further include an output interface 640.

Here, the processor 610 can control the output interface 640 to communicate with other devices or chips, and in particular, output information or data to other devices or chips.

It can be appreciated that the chip 600 may be applied in the network device according to the embodiment of the present disclosure, and the chip may implement the corresponding processes implemented by the network device in any of the methods according to the embodiments of the present disclosure, or the corresponding processes implemented by the terminal device in any of the methods according to the embodiments of the present disclosure. For the sake of brevity, details thereof will be omitted here.

It can be appreciated that the components in the chip 600 may be connected via a bus system. Here, the bus system may include a power bus, a control bus and a status signal bus, in addition to a data bus.

The above processor may include, but not limited to, a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component.

The methods, steps, and logical block diagrams disclosed in the embodiments of the present disclosure can be implemented or performed by the processor. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, erasable programmable memory, or register. The storage medium can be located in the memory, and the processor can read information from the memory and perform the steps of the above methods in combination with its hardware.

The above memory may include, but not limited to, a volatile memory and/or a non-volatile memory. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM).

It is to be noted that the memory used for the system and method described in the present disclosure is intended to include these and any other suitable types of memories.

An embodiment of the present disclosure also provides a computer readable storage medium for storing a computer program. The computer readable storage medium stores one or more programs including instructions which, when executed by a portable electronic device including a plurality of application programs, enable the portable electronic device to perform the method according to any of the method embodiments.

Optionally, the computer readable storage medium may be applied to the first device in the embodiment of the present disclosure, and the computer program causes the computer to execute the corresponding process implemented by the first device in any of the methods according to the embodiments of the present disclosure. For the sake of brevity, details thereof will be omitted here. Optionally, the computer readable storage medium can be applied to the second device in the embodiment of the present disclosure, and the computer program causes the computer to execute the corresponding process implemented by the second device in any of the methods according to the embodiments of the present disclosure. For the sake of brevity, details thereof will be omitted here.

An embodiment of the present disclosure also provides a computer program product including a computer program.

Optionally, the computer program product can be applied to the first device in the embodiment of the present disclosure, and the computer program can cause a computer to perform corresponding procedures implemented by the first device in the method according to any of the embodiments of the present disclosure. Details thereof will be omitted here for simplicity. Optionally, the computer program product can be applied to the second device in the embodiment of the present disclosure, and the computer program can cause a computer to perform corresponding procedures implemented by the second device in the method according to any of the embodiments of the present disclosure. Details thereof will be omitted here for simplicity.

An embodiment of the present disclosure also provides a computer program which, when executed by a computer, causes the computer to perform the method according to any of the method embodiments.

Optionally, the computer program can be applied to the first device in the embodiment of the present disclosure. The computer program, when executed by a computer, can cause the computer to perform corresponding procedures implemented by the first device in the method according to any of the embodiments of the present disclosure. Details thereof will be omitted here for simplicity. Optionally, the computer program can be applied to the second device in the embodiment of the present disclosure. The computer program, when executed on a computer, can cause the computer to perform corresponding procedures implemented by the second device in the method according to any of the embodiments of the present disclosure. Details thereof will be omitted here for simplicity.

In addition, an embodiment of the present disclosure further provides a communication system, which may include the above first device and the second device to form the communication system as shown in FIG. 1. Details thereof will be omitted here for simplicity. It should be noted that the term "system" and the like as used herein may also be referred to as "network management architecture" or "network system" or the like.

It should also be understood that the terms used in the embodiments of the present disclosure and the claims as attached are only for the purpose of describing specific embodiments, and are not intended to limit the embodiments of the present disclosure. For example, as used in the embodiments of the present disclosure and the claims as attached, the singular forms "a," "the," "above," and "said" are intended to include the plural forms as well, unless the context clearly indicates otherwise.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of the embodiments of the present disclosure.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

It can be appreciated by those skilled in the art that, for the convenience and brevity of description, for the specific operations and processes of the system, apparatus and unit as described above, reference can be made to the corresponding processes in the above method embodiments, and details thereof will be omitted.

In the embodiments of the present disclosure, it can be appreciated that the disclosed systems, devices, and methods may be implemented in other ways. For example, the divisions of the units or modules or components in the apparatus embodiments as described above are only divisions based on logical functions, and there may be other divisions in actual implementations. For example, more than one unit or module or component may be combined or integrated into another system, or some units or modules or components can be ignored or omitted. In another example, the units/modules/components described above as separate/explicit components may or may not be physically separated, that is, they may be co-located or distributed across a number of network elements. Some or all of the units/modules/components may be selected according to actual needs to achieve the objects of the embodiments of the present disclosure.

While the specific embodiments of the present disclosure have been described above, the scope of the embodiments of the present disclosure is not limited to these embodiments. Various variants and alternatives can be made by those skilled in the art without departing from the scope of the embodiments of the present disclosure. These variants and alternatives are to be encompassed by the scope of the embodiments of present disclosure as defined by the claims as attached.

What is claimed is:

1. A wireless communication method, comprising:
    receiving, by a first device, first control information transmitted by a second device, the first control information being used to schedule transmission of S physical channels, at least one of the S physical channels corresponding to a first physical channel group or a first feedback bit group, the first physical channel group or the first feedback bit group corresponding to a first Hybrid Automatic Repeat reQuest-Acknowledgement (HARQ-ACK) codebook, the first HARQ-ACK codebook corresponding to a first feedback resource, the first control information corresponding to a first control information format, and transmission of a maximum number M of physical channels being schedulable by the first control information format, where M is a positive integer greater than or equal to 2, and S is a positive integer greater than or equal to 1 and smaller than or equal to M; and transmitting, by the first device, the first HARQ-ACK codebook via the first feedback resource;

wherein the first feedback bit group comprises a fixed number N pieces of feedback information, N is configured by the second device, where N is a positive integer greater than or equal to 1; and/or N is a positive integer smaller than M;

when S is smaller than or equal to N, feedback bit positions of the first S physical channels in feedback bit positions of the first feedback bit group are feedback bit positions of the S physical channels, and/or when S is greater than N, a feedback bit position of one physical channel in feedback bit positions of the first feedback bit group is a feedback bit position of at least two of the S physical channels adopting bunding feedback.

2. The method according to claim 1, wherein the first physical channel group comprises N physical channels, where N is a positive integer greater than or equal to 1; and/or N is a positive integer smaller than or equal to M.

3. The method according to claim 1, wherein the first device is configured with a spatial division bundling feedback mode, and each of the N physical channels corresponds to 1 bit of feedback information.

4. The method according to claim 2, wherein S is greater than $(K-1)*N$ and smaller than or equal to $K*N$, where K is a positive integer; and a feedback bit position of one physical channel in feedback bit positions corresponding to the first physical channel group is a feedback bit position of K of the S physical channels adopting bundling feedback, or a feedback bit position of one physical channel in feedback bit positions of the first feedback bit group is a feedback bit position of K of the S physical channels adopting bundling feedback.

5. The method according to claim 2, wherein M is greater than N; and a feedback bit position of one physical channel in feedback bit positions corresponding to the first physical channel group is a feedback bit position of at least two of the M physical channels adopting bundling feedback, or a feedback bit position of one physical channel in feedback bit positions of the first feedback bit group is a feedback bit position of at least two of the M physical channels adopting bundling feedback.

6. The method according to claim 2, wherein a feedback bit position of one physical channel in feedback bit positions corresponding to the first physical channel group is a feedback bit position of Ceil (M/N) of the M physical channels adopting bundling feedback; or a feedback bit position of one physical channel in feedback bit positions of the first feedback bit group is a feedback bit position of Ceil (M/N) of the M physical channels adopting bundling feedback, where Ceil ( ) represents a rounding up operation.

7. The method according to claim 1, wherein the at least two physical channels are K physical channels, where a value of K is predefined, or determined according to a predefined rule, or configured by the second device.

8. The method according to claim 1, wherein when feedback information of all of the at least two physical channels is ACK, feedback information of the at least two physical channels is ACK; and/or when feedback information of any of the at least two physical channels is NACK, feedback information of the at least two physical channels is NACK.

9. The method according to claim 1, further comprising:

receiving, by the first device, second control information transmitted by the second device, the second control information not being used to schedule transmission of a physical channel;

and the second control information corresponding to a second feedback bit group and the second feedback bit group corresponding to the first HARQ-ACK codebook, and/or the second control information corresponding to the first control information format and the second control information corresponding to the first HARQ-ACK codebook.

10. The method according to claim 9, wherein the second control information is used to release a semi-persistent scheduling configuration, or the second control information is used to activate or deactivate a dormant state of a secondary cell.

11. The method according to claim 1, wherein the first control information comprises first scheduling count information; and the first scheduling count information indicates:

an order position of the first physical channel group in physical channel groups transmitted by the second device within a HARQ feedback window; or an order position of the first feedback bit group in feedback bit groups within a HARQ feedback window; or an order position of the first control information in control information transmitted by the second device within a HARQ feedback window.

12. The method according to claim 1, wherein the first control information comprises first scheduling total number information; and the first scheduling total number information indicates:

a total number of physical channel groups that are transmitted until the first physical channel group within a HARQ feedback window;

a total number of corresponding feedback bit groups that are counted until the first feedback bit group within a HARQ feedback window; or a total number of pieces of control information that are transmitted by the second device until the first control information within a HARQ feedback window.

13. The method according to claim 1, wherein the first control information comprises first group identification indication information, the first group identification indication information indicates a first group, and wherein all of the S physical channels correspond to the first group; or at least one of the S physical channels corresponds to the first group.

14. The method according to claim 13, wherein the first control information further comprises first scheduling count information; and the first scheduling count information indicates:

an order position of the first physical channel group in physical channel groups that are transmitted within a HARQ feedback window and correspond to the first group;

an order position of the first feedback bit group in feedback bit groups that are transmitted within a HARQ feedback window and correspond to the first group; or an order position of the first control information in control information that is transmitted by the second device within a HARQ feedback window and corresponds to the first group.

15. The method according to claim 13, wherein the first control information further comprises first scheduling total number information; and the first scheduling total number information indicates:

a total number of physical channel groups that are transmitted until the first physical channel group within a HARQ feedback window and correspond to the first group;

a total number of feedback bit groups that are counted until the first feedback bit group within a HARQ feedback window and correspond to the first group; or a total number of pieces of control information that are transmitted by the second device until the first control information within a HARQ feedback window and correspond to the first group.

16. The method according to claim 13, wherein the first control information further comprises second scheduling total number information; and the second scheduling total number information indicates a total number of physical channel groups that are transmitted until the first control information within a HARQ feedback window and correspond to a second group, and the second group and the first group are different groups.

17. The method according to claim 11, wherein the first scheduling count information comprises Counter-Downlink Assignment Index (C-DAI) information and/or Counter-Sidelink Assignment Index (C-SAI) information.

18. The method according to claim 12, wherein the first scheduling total information comprises Total-Downlink Assignment Index (T-DAI) information and/or Total-Sidelink Assignment Index (T-SAI) information.

19. The method according to claim 1, further comprising:

receiving, by the first device, third control information transmitted by the second device, the third control information corresponding to a second control information format, and the second control information format being different from the first control information format, or a maximum number of physical channels of which transmission is schedulable by the second control information format not being M; and determining, by the first device, that the third control information corresponds to a second HARQ-ACK codebook, the second HARQ-ACK codebook being different from the first HARQ-ACK codebook.

20. The method according to claim 1, wherein an interpretation method of an information field in the first control information is determined according to a high-layer param-eter configured by a network device, or predetermined, or associated with the first control information format, or associated with the maximum number of physical channels scheduled by the first control information.

21. The method according to claim 1, wherein the at least one of the S physical channels comprises all of the S physical channels; or the at least one of the S physical channels comprises a first one of the S physical channels, a time interval between the first physical channel and the first feedback resource satisfying a processing timing.

22. The method according to claim 21, wherein the time interval between the first physical channel and the first feedback resource satisfying the processing timing com-prises: a time interval between an end position of the first physical channel and a start position of the first feedback resource satisfying a processing timing, or a time interval between an end position of the first physical channel and a start position of the first feedback resource being greater than or equal to a predetermined value.

23. The method according to claim 1, wherein a time domain position of the first feedback resource is determined according to a first value in a HARQ feedback timing set, and wherein the HARQ feedback timing set comprises at least two values and HARQ feedback timing indication informa-tion included in the first control information indicates the first value; or the HARQ feedback timing set comprises only the first value, and the first control information includes no HARQ feedback timing indication information.

24. The method according to claim 23, wherein the first value is K1, where K1 is greater than or equal to 0, and a time slot in which the first feedback resource is located is determined based on one of the following:

when an end position of the last one of the S physical channels is in time slot n, the first feedback resource is located in time slot n+K1;

when an end position of the first one of the S physical channels is in time slot n, the first feedback resource is located in time slot n+K1; or when an end position of the first control information is in time slot n, the first feedback resource is located in time slot n+K1.

25. The method according to claim 1, wherein at least two of the M physical channels correspond to different Transport Blocks (TBs); or when S is greater than or equal to 2, at least two of the S physical channels correspond to different TBs.

26. A first device, comprising: a processor and a memory, wherein the memory has a computer program stored thereon, and the processor is configured to invoke and execute the computer program stored in the memory to perform the method according to claim 1.

* * * * *